United States Patent
Huang

(10) Patent No.: US 9,633,766 B2
(45) Date of Patent: Apr. 25, 2017

(54) ENERGY EFFICIENT CONDUCTORS WITH REDUCED THERMAL KNEE POINTS AND THE METHOD OF MANUFACTURE THEREOF

(71) Applicant: Jianping Huang, Markham (CA)

(72) Inventor: Jianping Huang, Markham (CA)

( * ) Notice: Subject to any disclaimer, the term of this patent is extended or adjusted under 35 U.S.C. 154(b) by 0 days.

(21) Appl. No.: 14/863,396

(22) Filed: Sep. 23, 2015

(65) Prior Publication Data
US 2016/0099090 A1 Apr. 7, 2016

Related U.S. Application Data

(60) Provisional application No. 62/056,330, filed on Sep. 26, 2014, provisional application No. 62/148,915, filed on Apr. 17, 2015.

(51) Int. Cl.
| | | |
|---|---|---|
| H01B 9/02 | (2006.01) |
| H01B 9/04 | (2006.01) |
| H01B 7/00 | (2006.01) |
| H01B 13/24 | (2006.01) |
| H01B 1/02 | (2006.01) |
| H01B 1/24 | (2006.01) |
| H01B 3/44 | (2006.01) |
| H01B 7/28 | (2006.01) |
| H01B 7/282 | (2006.01) |
| H01B 7/29 | (2006.01) |
| H02G 1/02 | (2006.01) |

(52) U.S. Cl.
CPC ........... *H01B 13/245* (2013.01); *H01B 1/023* (2013.01); *H01B 1/026* (2013.01); *H01B 1/24* (2013.01); *H01B 3/441* (2013.01); *H01B 7/2806* (2013.01); *H01B 7/2825* (2013.01); *H01B 7/292* (2013.01); *H02G 1/02* (2013.01)

(58) Field of Classification Search
CPC ......... H01B 7/223; H01B 1/023; H01B 1/026
USPC .............................. 174/102 A, 102 R, 113 R
See application file for complete search history.

(56) References Cited

U.S. PATENT DOCUMENTS

| | | | | |
|---|---|---|---|---|
| 1,794,269 A * | 2/1931 | Zagorski | ................. | H01B 5/10 138/129 |
| 3,378,631 A * | 4/1968 | Edwards | ............... | H01B 5/101 174/130 |
| 3,674,915 A * | 7/1972 | Pritchard | ............... | H01B 3/441 174/102 R |
| 3,749,813 A * | 7/1973 | Shealy | .................... | H02G 7/14 174/127 |
| 3,813,481 A * | 5/1974 | Adams | ................... | H01B 5/104 174/128.1 |
| 3,813,772 A * | 6/1974 | Adams | ............... | H01B 13/0235 174/108 |
| 5,243,137 A * | 9/1993 | Gentry | .................. | H01B 5/104 156/50 |
| 5,808,238 A * | 9/1998 | Munakata | ............... | H02G 7/20 174/117 R |

(Continued)

*Primary Examiner* — Sherman Ng
(74) *Attorney, Agent, or Firm* — Michael D. Eisenberg

(57) ABSTRACT

The present invention relates to electrical conductors for electrical transmission and distribution with pre-stress conditioning of the strength member so that the conductive materials of aluminum, aluminum alloys, copper, copper alloys, or copper micro-alloys are mostly tension free or under compressive stress in the conductor, while the strength member is under tensile stress prior to conductor stringing, resulting in a lower thermal knee point in the conductor.

17 Claims, 6 Drawing Sheets

(56) References Cited

U.S. PATENT DOCUMENTS

| | | | | |
|---|---|---|---|---|
| 6,147,303 A * | 11/2000 | Abe | ............... | G02B 6/4419 |
| | | | | 174/117 R |
| 7,622,681 B2 * | 11/2009 | Kikuchi | ............ | H01B 5/006 |
| | | | | 174/128.2 |
| 2004/0026112 A1 * | 2/2004 | Goldsworthy | ...... | G02B 6/255 |
| | | | | 174/106 R |

* cited by examiner

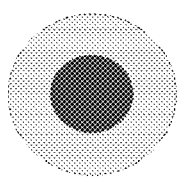 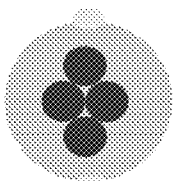 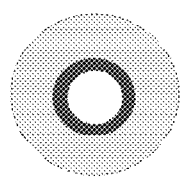 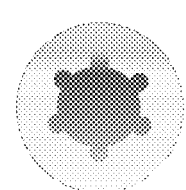 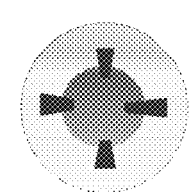
Fig. 6A     Fig. 6B     Fig. 6C     Fig. 6D     Fig. 6E
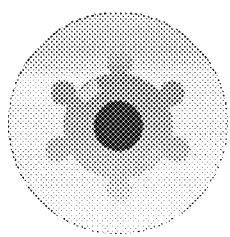 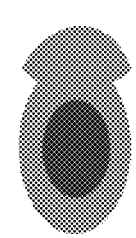 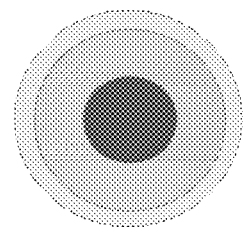 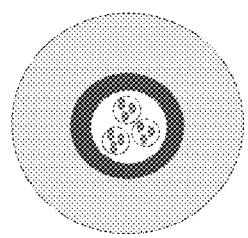
Fig. 6F     Fig. 6G     Fig. 6H     Fig. 6I
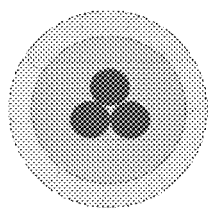 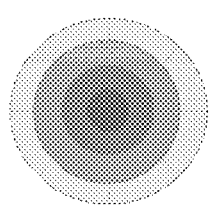 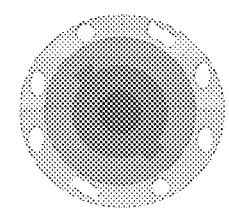 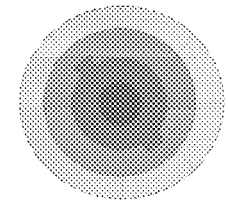
Fig. 6J     Fig. 6K     Fig. 6L     Fig. 6M
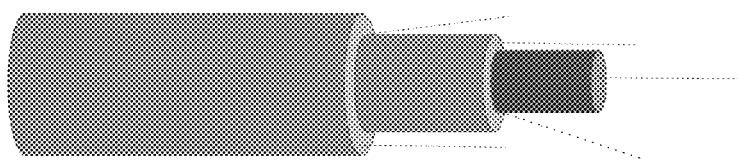
Fig. 6N

ENERGY EFFICIENT CONDUCTORS WITH REDUCED THERMAL KNEE POINTS AND THE METHOD OF MANUFACTURE THEREOF

CROSS-REFERENCES TO RELATED APPLICATIONS

The present application claims priority from U.S. Provisional Application Ser. No. 62/056,330 filed on Sep. 26, 2014 and from U.S. Provisional Application Ser. No. 62/148,915 filed on Apr. 17, 2014 which are each hereby incorporated herein by reference in their respective entirety.

TECHNICAL FIELD OF THE INVENTION

The present invention relates to electrical conductors for electrical transmission and distribution with pre-stress conditioning. In particular, the present invention relates to electrical conductors with strength members such as fiber reinforced composites. More specifically, the present invention relies upon pre-stress conditioning of the strength member so that the conductive materials of aluminum, aluminum alloys, copper, copper alloys, or copper micro-alloys are mostly tension free or under compressive stress in the conductor, while the strength member is under tensile stress prior to conductor stringing, resulting in lower thermal knee point in the conductor.

BACKGROUND OF THE INVENTION

Conventional electrical transmission conductors, e.g., ACSR (Aluminum Conductor Steel Reinforced), are broadly used in electrical transmission and distribution networks. Newer conductors reinforced with composites of lower thermal expansion than steel are adopted in electrical transmission and distribution networks to increase capacity and efficiency while reducing cost and complying with electric grid requirements (e.g., reliability and safety), due to their superior high temperature low sag characteristics. These newer conductors use aluminum (fully annealed) or high temperature aluminum alloys, reinforced with strength members such as metal matrix or polymer matrix composites. ACSS Conductor (Aluminum Conductor Steel Supported) is another high temperature conductor, and it uses annealed aluminum for high temperature operation.

The thermal knee point is relevant in conductors made of differing materials (e.g., strength member vs. conductive member) and is defined as the temperature above which the conductive constituents in the conductor are no longer carrying tensile load or are in compression. The conductive constituents in these conductors, such as aluminum, aluminum alloys, copper or copper alloys are typically under tensile stress after conductor stringing, resulting in thermal knee point higher than the majority of operating temperatures. Until the conductor reaches above its thermal knee point, the conductor thermal expansion is substantially controlled by conductive material such as aluminum or copper with high thermal expansion coefficient, resulting in large sag, limiting the conductor's current carrying capacity, as shown in FIG. 1. This is especially significant for conductors in reconductoring applications or in long span applications where thermal sag often becomes the limiting factor for increasing current carrying capacity in electric transmission and distribution network.

Besides the constituent material's properties, conductor thermal knee point is also affected by the conductor's tension and its tension history.

Gap conductor is a special high temperature conductor with low thermal sag by suppressing conductor thermal knee point. This was accomplished by suppressing the thermal knee point in Gap conductor during special conductor installation procedure. Gap conductor is made with steel wires and high temperature aluminum alloys where a precisely controlled gap between the steel core (i.e., strength members) and the inner aluminum strand layer is maintained and filled with high temperature grease to facilitate relative motion between steel wires and the aluminum layers in conductor installation operation. Gap conductor must be installed by tensioning the steel wires (after stripping the aluminum layers to expose the steel wires) between transmission deadend towers. This tensioning process can be as long as 48 hours or more, and requires special device and extra labor time from linemen as the linemen have to revisit the towers for final deadending after the tensioning process. When properly installed, the conductor does exhibit low thermal sag as its thermal knee point is at or close to the installation temperature, and the conductor thermal sag is only controlled by the thermal expansion of steel wires (whose thermal expansion coefficient is about half of that of aluminum). However, Gap conductors are typically very expensive. It is difficult to install, requiring special training and tools and significantly more labor time in the field. Furthermore, since the conductor strength member is taking virtually all the load and it retracts inside the Gap conductor's aluminum layers if the conductor breaks, it is impossible to repair gap conductor in the field. The entire conductor segment from deadend to deadend must be replaced and installed, resulting in costly delays in restoring electrical transmission. The grease inside the gap conductor has being reported to leak out through the aluminum strands over time, staining objects under the power lines as well as corona noise due to water beading on conductor surface as a result of the hydrophobic greasy surface. The grease in Gap conductor is also for protecting the steel wires from corrosion, and removal of the grease will result in compromised corrosion resistance of gap conductors.

Another approach in getting low conductor thermal knee point is discussed in Chinese patent CN102103896A[1], which mentioned a process of stranding annealed aluminum on the periphery of the steel core wires, while the bearing steel core wires are subjected to pre-stress treatment. The resulting conductor is claimed to be capable of continuous operation at temperatures up to 150° C. The product, made from this patent, was introduced to a major Chinese transmission project in 2013 for commercialization, where the conductor failed in field installation due to extensive birdcaging and uneven sag, and had to be replaced with conventional conductors and further application was prohibited by State Grid Corp of China. The patent did not discuss thermal knee point, or disclose the extent of pre-stress level, the stress level in aluminum strands, or the exact process and setup for pre-stressing core wires. The annealed aluminum strand, which readily deforms, likely bulged outwards when tensions in the steel core wires were released from the high level during pre-stress. When the conductor is wrapped in the take-up reel as typically done during conductor stranding manufacturing, the overlaying of these pre-stressed multi-strand conductors likely caused irreversible deformation of the annealed substantially loose/open aluminum strands in all the under layers of conductors. These permanent deformation of aluminum strands will cause not only conductor birdcaging, but also localized deformed aluminum strands to break and causing hot spots and conductor failure during energized conductor operation. Similar approach for thermo-resistant aluminum alloy conductor were also attempted in 2002[2], by JPS without much better commercial success. The severely loose aluminum alloys strands posed same challenges. The core in the conductor might be protected with a thin aluminum cladding in JPS approach for high temperature operation, however, the aluminum cladding on the core is also subjected to extreme tension as high as 190 MPa during the pre-stretching process of the core while aluminum strands are stranded, making it vulnerable to vibration fatigue. The thin cladding is unable to sustain the tensioned core and minimize its shrinking inside the conductor that the ends of the conductor must be fixed before the tension in the core is released, forcing all the aluminum strands to be very loose. The loose aluminum strands and the need to fix the conductor ends make it difficult to handle the conductors in both manufacturing and field stringing.

High temperature conductors, such as INVAR[3] and ACCR[4] conductors, with their constituent materials capable of sustained operation at high temperatures, use Al—Zr high temperature alloys. These conductors typically have high thermal knee points, often approaching or above 100° C., well above their everyday operating conditions (see table 1). Pre-Tensioning of conductors in the field is rarely attempted.

Pre-tensioning of ACSS conductors are occasionally done. This is accomplished when the ACSS conductors are already in and between towers, and a significant level of tension stress (e.g., a load equivalent to 40% conductor rated tensile strength) is applied to the conductor for hours before deadending. Pre-tensioning of ACSS does reduce thermal knee point and improve thermal sag, however, the high stress required in ACSS in tensioning increases risk to the safe operation of the transmission towers, especially for older transmission towers in reconductoring application projects.

There have been greater acceptance for conductors with strength member(s) made of fiber reinforced polymeric matrix composites and stranded with annealed aluminum, such as ACCC by CTC Global[5], C[7] by South wire, Low Sag from Nexans[6], and other similar types during the past decade. These conductors are typically supported by carbon fiber reinforced composite as strength member(s), and an insulating layer(s) on top of carbon composite between carbon core and aluminum to prevent galvanic corrosion. The carbon composite core has one of the lowest thermal expansion coefficients, and these conductors are very low in thermal sag above thermal knee point, and can be operated to temperatures as high as 200° C., delivering significantly higher ampacity than ACSR conductors (when needed such as N−1 emergency situations). These conductors are strong and light weight, and the composite strength member(s) are resistant to corrosion associated with steel types of strength members.

These composite core conductors, however, typically have thermal knee points of 70° C. or higher. Below this temperature, the conductor thermal elongation is dominated by the aluminum strands, exhibiting substantial thermal sag. Virtually all these conductors are used in reconductoring for capacity expansion to leverage existing infrastructure and the existing right of way. It is uncommon for these conductors to be pre-stressed on existing towers as the older towers may not be capable of high level pre-tension required to substantially suppress conductor thermal knee point. These composite core(s) are vulnerable to fiber buckling failure from excessive axial compressive stress during installation, such as the case in sharp angle situations associated with mishandling. Conductors with smaller cores, with better bend flexibility, are ironically more vulnerable as these conductors do not require much bend stress to fail when subjected to sharp angle (with the aluminum strands in the stranded conductors, sliding to accommodate bending of the strength member), especially when tension on the composite strength member is absent. If the core suffers only partial damage, the conductor failure could be delayed by months or years after the initial damage, posing serious threat to the safety and reliability of electricity transmission network.[7] A composite core conductor, that is robust against mishandling and whose strength member is under substantial pre-existing tension while the conductive constituents are substantially tension free, would be very desirable for safe handling and installation and necessary for the safety and reliability of the electric transmission and distribution network.

While the annealed aluminum in these conductors offers maximum electrical conductivity, they readily deform under tensile stress. These conductors rely on the core for mechanical load, typically requiring special hardware fittings to secure the core(s). Hardware costs for projects using such conductors sometimes are as high as 50% of total project cost, which is unacceptable, especially for cost sensitive applications such as lower voltage electrical distribution network. Expensive special fittings such as collet housing approach from CTC Global or aluminum sleeve approach inside the compression fitting from AFL must be used with conductors with composite strength members. Furthermore, these conductors must follow precisely prescribed stringing temperature and time duration, especially in bundled configurations during stringing, making the installation process prohibitively expensive. If the tension and time history of the phase conductors are different, there could be different thermal knee points for each conductor and differential sagging among the bundled phase conductors after installation, causing flashing or even short circuits with changing conductor temperatures. For example, in a 220 kv ACCC recondcutoring project in china in 2011[8], the field engineer reported that the sags of phase conductors (ACCC Drake) exhibited large variation despite the same stringing tension of 18 KN. One conductor was clipped in on Mar. 30, 2011, and the conductor sag had significantly increased by 0.69 m when observed on April $2^{nd}$ and by 0.77 meters on Apr. 3, 2011. Two other phase conductors in the same circuit and at the same location were clipped a day later on Mar. 31, 2011 under identical stringing tension of 18 KN, and the sags of each conductor were observed to increase by 0.9 m on April $2^{nd}$ and 1.175 m on April $3^{rd}$ for one conductor, and by 0.78 m on April $2^{nd}$ and 0.86 m on April $3^{rd}$ for the other conductor. Such changes in conductor sag are not only substantial but also seemed random and unpredictable, a significant issue for field engineers and the electric utility. If these conductors are already at low thermal knee point (and preferably without the need to pre-tensioning in the old towers in such a reconductoring project), one could install these conductors at ease to get target sag clearance during and after stringing without the sensitivity to installation practice (e.g., variability in the stringing time, stringing temperature, stringing tension among phase conductors).

Another challenge for conductors with carbon fiber polymeric composite core and annealed aluminum is their high sag in heavy ice environments. To avoid excessive stringing tension load onto the towers while maintaining sag clearance, engineers sometimes adjust the conductor to further improve sag after the conductor was subjected to ice loads for the first time where the conductor tension drops after ice load. This requires extra time and expensive effort from linemen. If these conductors are already at low thermal knee point without high degree of pre-tension treatment in tower, one could install these conductors at higher clearance without increased tension to electrical tower, thus better able to handle sag from heavy ice loads. This procedure will be unnecessary if a pre-tension treated conductor is used.

In electric distribution network, where it operates at lower voltage, conductors are subjected to higher current density due to cost constraints. With increasing difficulty in securing right of way to build new electric transmission and distribution network, it is highly desirable for high temperature conductors to be deployed for distribution that can substantially increase capacity when needed in emergency, while delivering good energy efficiency. These are typically smaller conductors, and it is important to have a conductor system solution that is cost effective (in conductor, in fittings and installation) as well as easy to install, maintain and repair.

Accordingly, there remains a need for knee point suppressed conductor capable of high temperature operation without the need for conductor pre-stressing at the electric towers that may compromise the tower safety. Furthermore, it is desirable to have a conductor solution using composite strength member that is cost effective, easy to work with (installation consistency and free of birdcage, robust against mishandling in the field, easy to repair and maintain, better energy efficiency, ultra-low sag, and compatibility with existing fitting). The present invention solves these issues by providing a complete conductor system solution that is cost effective (conductor, installation, repair and hardware), high capacity and energy efficient, low sag under high temperature and heavy ice, and virtually no sag change with temperature variations by ensuring the strength member(s) in the conductor is under pre-stressed condition while substantial amount of the conductive media is under no tension or under compression without damaging the conductor integrity (e.g., birdcaging) prior to conductor installation onto the towers.

BRIEF SUMMARY OF EMBODIMENTS OF THE INVENTION

This section is a summary of the invention, and not meant to be a complete disclosure of the invention in its entirety in terms of scope and features.

Embodiments of the present invention are electrical conductors whose thermal knee points were substantially reduced, without pre-tensioning treatment at electric towers.

More particularly, embodiments of the present invention rely upon pre-tensioning treatment and preservation of pre-tensioning of the strength member(s) in an electrical conductor with aluminum, aluminum alloy, copper or copper alloy including micro alloy as conductive media, without relying on pre-stress conditioning of the conductor on the electric transmission or distribution towers. Additionally, the strength members are encapsulated with at least a layer of the above mentioned conductive materials.

The strength member(s) in the conductor can be single strand of or multi-strands of steel, invar steel, high strength or extra high or ultra high strength steel, high temperature steel, nonmetallic fiber reinforced metal matrix composite, carbon fiber reinforced composite of either thermoplastic or thermoset matrix, or composites reinforced with other types of fibers such as quartz, AR-Glass, E-Glass, S-Glass, H-Glass, silicon carbide, silicon nitride, alumina, basalt fibers, specially formulated silica fibers and a mixture of these fibers and the like. The reinforcement in the composite strength member(s) can be discontinuous such as whiskers or chopped fibers; or continuous fibers in substantially aligned configurations (e.g., parallel to axial direction) or randomly dispersed (including helically wind or woven configurations). The strength member(s) in the conductor can be a mixture of the above mentioned differing varieties of strand types or fiber types.

A further embodiment of the present invention includes strength member(s) encapsulated with annealed aluminum (e.g., 1350-O), aluminum (e.g., 1350-H19), aluminum alloys (e.g., Al—Zr alloys, 6201-T81, -T82, -T83, etc.), copper, copper alloys (e.g., copper magnesium alloys, copper tin alloys, copper micro-alloys, etc.) through a conforming machine or conforming unit for single layer conductive media or through a series of conforming machines for conductors of multiple layer configuration. The encapsulation process can be accomplished with a similarly functional machine other than conforming machine, and be optionally further drawn to achieve target characteristics (i.e., desired geometry or stress state). The conforming machines or the like allows quenching of the encapsulating conductive material. The conforming machine can be integrated with stranding machine for strength members, or with pultrusion machines used in making fiber reinforced composite strength members, such as ACCC core from CTC Global, ACCR core from 3M, and Lo Sag Core from Nexans. Additional encapsulated conductive layers may be added. In one characterization, copper layer maybe added above the aluminum encapsulating layer for train related applications. Additional conductive layers may be optionally stranded around the pre-tension treated strength member(s) encapsulated with conductive material, and preferably this is for the outer layer, and this is preferably stranded with Z, C or S wires to keep the outer strands in place. In one characterization, the strength member is multi strands of high strength steel, the encapsulating layer is aluminum, and the stranded aluminum layer is aluminum round or Trapezoidal strands. In some characterization, the strength member is carbon fiber reinforced composite, and the encapsulating layer is aluminum, followed by another encapsulating layer of copper. In one characterization, the strength member is multiple strands of steel, and the encapsulating layer is aluminum, followed by Z shaped aluminum strands. In yet another characterization, the strength member is multiple strands of carbon fiber or ceramic reinforced composite materials, and the immediate encapsulating layer is aluminum, and the outer strands are S shaped aluminum strands.

The encapsulating conductive material may reach up to 500° C. or higher temperatures during conforming, quenching of the conductive material (e.g., aluminum, aluminum alloy, copper or copper alloy, etc.) effectively limits exposure time of strength member (such as high temp steel, composites of polymeric matrix) to such high temperatures to preserve the integrity and property of the strength members(s). The adhesion and compaction of conductive material around the strength member(s) at ambient or sub ambient temperatures are important to preserve the effect of residual tensile stress in the strength member(s), otherwise, the higher CTE conductive material will exert a compressive stress onto the strength member of lower thermal expansion coefficient, diminishing the effect of pre-tensioning onto the strength members.

The strength member(s) are adequately tensioned while the encapsulating conductive layer(s) of aluminum or copper or their respective alloys are applied to encapsulate around the strength member(s) to form a cohesive conductive hybrid rod that is spool-able onto a conductor reel. To facilitate conductor spooling onto a reel and conductor spring back at ease, the conductor may be optionally configured to be non-round (e.g., elliptical) such that the shorter axis (in conductor) is subjected to bending around a spool (or a sheaves wheel during conductor wire installation) to facilitate a smaller bend or spool radius, while the strength members(s) are configured to have longer axis facilitate spring back for installation. The overall conductor may be round with non-round strength member or multiple strength members arranged to be non round, and the spooling bending direction should be along the long axis of the strength member to facilitate conductor spring back while not overly subjecting conductive metal layer with additional compressive force from spooling bending. To further facilitate spooling of the conductor, the conductive material may be split into multiple segments (e.g., 2, 3, 4 etc.), and each segment is bonded to strength member while retaining compressive stress, and the segments (similar to conductive strands in conventional conductor, except that they are bonded to the strength member) rotates one full rotation or more along the conductor length (equal to one full spool in a reel) to facilitate easy spooling. The resulting conductive hybrid rod can be a conductor, directly used for DC applications or AC applications where skin effect is negligible (i.e., conducting layer thickness is less than the skin depth required at AC circuit frequency), with the core under sufficient residual tensile stress, and the aluminum layers mostly free of tension or under compressive stress. Optional insulating layer (e.g., as used in distribution insulated conductor) may be applied to make electrical cable from this invention.

Referring to FIGS. 7A-7E, the configuration of encapsulated core/conductors are shown. In FIG. 7A, the baseline option for a round looking conductor where the core is symmetrically and concentrically placed in the middle; FIG. 7B depicts an example of non-round conductor, where significant amount of conductive material such as aluminum, is not being forced to endure additional compression during spooling into a reel; FIG. 7C depicts an example of another non-round conductor, where the stiffer core is purposely positioned toward the lower edge to minimize the amount of conductive material such aluminum being compressed when the conductor is spooled onto a reel; FIG. 7D depicts an example of non-round conductor with a non-round strength member. This minimizes the maximum compressive stress onto the conductive material right below the strength member position, and retains full stiffness from the strength member (core) for ease of spring back during installation; FIG. 7E depicts an example of a round conductor with a non-round strength member for maximum spring back as well as minimal amount of conducting material such as aluminum under additional compression due to spooling into a reel or bending against sheave wheel during installation. Note that the conductive material in the conductor may be subjected to compression for knee point suppression, and during spooling or installation, the bottom side will be subjected to additional compression due to bending force. Variations of the above configurations may be made to accomplish the objective (e.g., preserving maximum flexibility for bending in certain direction, while retaining sufficient flexural stiffness in certain direction for adequate spring back. Furthermore, the encapsulating metal could optionally include intentionally indented or machined or extruded groves that spiral along the conductor axis to facilitate wrapping of the conductor onto reasonably sized reels or passing through small sheave wheels in installation.

For AC applications where skin effect is prominent, layers of conductive materials can be encapsulated concentrically around the strength member(s), with each layer being of finite thickness to maximize skin effect for lowest AC resistance at minimal conductor content. For large conductors with significant layers of conductive material, the outer layer of conductor can be optionally stranded to facilitate conductor spooling around a reasonably sized spool and facilitate conductor stringing. The outer most layer can be TW, C, Z, S or round strands if more aluminum or copper are required, as it will not cause permanent birdcaging problem (i.e., the inner layers of conductor media is not deformed such that they prevent the outer layers of strands from proper resettlement after tension is released or reduced). Accordingly, the smooth outer surface and the compact configuration can effectively reduce the wind load and ice accumulation, resulting in less sag from ice or wind related weather events. For copper conductors in AC applications, the additional copper layers or each copper strands may need a dielectric coating treatment for minimizing skin effect and AC electrical resistance. The conducting layer(s) using the concept of copper cladded aluminum may be desirable as the cladding copper skin maximizes the conductivity in AC circuit while the conductive layer is not as heavy or as expensive as copper in conducting media. In one particular characterization, each encapsulating layer has a thickness of at least 0.5 mm, such as at least about 2 mm, and even at least about 4 mm. The cladding or encapsulating metal area is at least 50% of the cross sectional area of strength member(s), such as at least 100% of the cross sectional area of the strength member(s), or even at least 200% of the cross sectional area of the strength member(s).

It is recognized in the patent that additional pre-stress conditioning of the above mentioned conductors can be accomplished by subjecting the conformed conductors to the following paired tensioner approach or trimming the predetermined encapsulated core length before deadending, all accomplished without exerting the high tensile stress to the tower arms required to pre-tension conventional conductors in the electric towers. For example, the conductors mentioned above are subjected to pre-tensioning treatment using sets of bull wheels prior to the first sheave wheel during stringing operation, without exerting additional load to the electric towers. This can be simply done by two sets of tensioners, with the first set maintaining normal back tension to the conductor drum/reel, while the second set restoring the normal stringing tension to avoid excessive load to electric towers, especially those old towers in reconductoring projects. The conductor is subjected to the pre-tensioning stress between the $1^{st}$ and $2^{nd}$ tensioners, typically about 2× of the average conductor every day tensile load to ensure that the pre-tensioning is driving its knee point below the normal operating temperature so that aluminum strands are not in tension for optimal self-damping and the conductor is virtually not changing its sag with temperature. It should be noted that larger bull wheels in the tensioners and larger sheave wheels will help in managing the minor loosening in the outer layer aluminum strands. While it is possible to apply the methodology described here for factory based conductor pre-tensioning during stranding (optional final step), which might be what was practiced in the Chinese patent (undisclosed), it is possible, and maybe manageable, but not advisable for conductors of multi-layer stranding because such conductors in the reel may suffer significant and serious deformation and damage to aluminum strands, especially the inner layer of strands, on the conductor reel, after pre-tensioning treatment in the stranding line, resulting in significant birdcaging and conductor handling issues (core restraining devices must also be applied to avoid the core from retracting inside the conductor). The process described here is equally applicable to conventional ACSS, ACSR, ACCC, ACCR, Lo-Sag, $C^7$, Invar conductor or like conductor types that are made of differing materials between the conductive constituent and strength member(s) to effectively shift conductor thermal knee point without exerting high pre-tension stress to electric towers.

Alternatively, the above mentioned conductors can be subjected to normal stringing in the field, especially for conductors with a single strength member such as ACCC by CTC Global or Low-Sag by Nexans. Between deadend towers, with one end of the conductor already attached to a deadend tower, one may attach an effective wedge clamp onto the strength member (e.g., the collet and collet housing assembly to the ACCC core, made by CTC Global) while relieving the conductor tension clamp, apply tension only to the strength member to stretch its length. As the conductive material such as layers of strands of aluminum or copper or their alloy slides back while the strength member(s) pulls out, a pre-determined length was cut out of the strength member, that is equivalent to the elongation in the strength member if subjected to a preset tensioning stress, then complete the deadending at the second deadend tower. The cut length in the encapsulated strength member in this invention or the strength member in regular conductor (i.e., other than the invention), may be varied depending on the degree of desired thermal knee point suppression. This method should be especially effective for spans with few or no suspension towers between the deadend towers. To facilitate core sliding, the conductor could be made with slightly more lubricants between the core or encapsulated strength member (to be stretched and trimmed) and the immediate slide-able layer of conducting material, or intentionally with a small gap between the two (sometimes called keystoning).

While the conductors described in the invention are mostly for high temperature applications, these conductors can also be considered for green field new transmission projects where reduced thermal knee point reduces thermal sag, increases line capacity. Pre-tensioning also eliminates tensile stress in the conductive material (aluminum or copper and their respective alloys), resulting in exceptional self-damping and the possibility of higher erection tension that reduces conductor tendency for galloping as well as fewer and shorter towers to lower the project construction costs. Shorter towers are also environmentally more appealing to the utility and the community it serves. The encapsulation layer also functions in a similar function as the extra aluminum sleeve required in the AFL fitting for conductors with composite strength members, making it compatible with all conventional compression fittings without any additional pieces, tools or special training. In some characterization, the length of the steel tube in conventional hardware may be lengthened to accommodate the higher strength encapsulated composite strength members, for example the clamping zone is increased in length of at least about 1%, such as at least 2%, and even at least 5%.

The invention can be applied to OPGW conductors, where the optical fibers may be inside a hollow strength member made of fiber reinforced composites or steel tube, and the conductive material is encapsulated around the pre-tensioned hollow strength member. Another embodiment of the invention is the distribution conductors where a pre-tensioned hollow composite core is encapsulated with aluminum or aluminum alloys or copper or copper alloys, and the hollow core is the conduit for optical fibers. Yet another embodiment of the invention is the large diameter conductor made with hollow strength member that is pre-tensioned when encapsulated with aluminum or aluminum alloys for ultra-high voltage applications where corona effect is minimized, and the core can be filled with optical fibers or just hollow.

The present invention further enables robust handling of the conductors with composite strength members encapsulated and protected, where the effective diameter of the strength members is substantially increased to that of the encapsulation layer outer diameter, minimizing the possibility of extreme sharp angle to the inner strength member, and avoiding the occurrence of excessive axial compressive stress to the strength members inside the encapsulation. The pre-tension substantially preserved in the strength member, especially when it is made with fiber reinforced unidirectional composite, uniquely offsets the compressive stress arising from conductor bending or sharp angles, minimizing or even eliminating the dangerous risk of fiber compressive buckling failure in such composite core conductors. The encapsulated strength members can be directly fitted with conventional fittings where crimping and conventional low cost tools may be applied. With the surface being round and hermetically sealed, there is significant improved corrosion resistance as the pollutants cannot easily lodge into the conductor strands, and the composite strength members in these conductors are effectively shielded and protected from oxygen or moisture ingression, UV or Ozone degradation (unlike the existing conductor configurations). Unlike the coating applied to steel strength members in some commercial conductors (aluminum clad steel or invar) where the conductive cladding significantly increases the thermal expansion coefficient of the strength member and worsening sag performance, the encapsulating layer is of such sufficient thickness that it provides life time protection for the encapsulated member, including the galvanic corrosion protection, which has been experienced in commercial conductors when thin aluminum cladding layer was eroded from vibration in the conductor (e.g., aluminum strands against the thin aluminum cladding), and the galvanic pair of aluminum and steel in the presence of electrolyte (e.g., water or conductive pollutants) accelerates the corrosion inside the conductor, shortening conductor life. In one characterization, the conductor strength members, when also sealed at cut ends such as deadending or conductor splicing, there is no risk for moisture or conductive salt ingressing into the strength member, galvanic corrosion between carbon fiber composite and aluminum or copper encapsulating layer may not be an issue because of absence of electrolyte at the interface between strength member and encapsulating metal layer (which is required for corrosion to take place), and the strength members such as steel or carbon fiber composite may not require galvanic corrosion protective layers. In carbon fiber composite strength member, there may not be a need for insulation layer such as glass fiber composites or insulating polymeric layer. In another characterization, the strength member made of mostly, if not all, with glass or glass types of reinforcement fibers vulnerable to stress corrosion under tension load, can be deployed for long term conductor installation because of absence of moisture ingress into the strength member. The encapsulating or cladding material is under no tension or is under compression, and it does not impact the effective thermal expansion coefficient of the encapsulated strength member(s), preserving the low sag characteristics of the strength members from its lower thermal expansion coefficient.

From afore mentioned description, one may clearly further understand the application scope. It should be known that, one may practice the invention from any single aspect, or a combination of one or more of the different aspects. It should be further known that, the illustration and examples are just meant to be illustration, not meant to be limiting the scope of the invention.

BRIEF DESCRIPTION OF DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIGS. 6A-6N are depict some examples of the cross sections of conductors with encapsulated strength members. FIG. 6A—Conductor with single strength member and single encapsulating layer; FIG. 6B—Conductor with plural strength members and a single encapsulating layer, and the encapsulating layer may have protruding surface feature(s) that is made of similar or different encapsulating material, and functions to disrupt vortex shedding in Aeolian vibration, eliminating Aeolian vibration fatigue concerns in the novel conductors; FIG. 6C—Conductor with hollow core (can be other hollow shapes) with encapsulating layer; FIGS. 6D & 6E are conductors with shaped strength members to enhance adhesion and interlocking between the strength members and the encapsulating layer, and the same locking feature is applied between the conductive layers. FIG. 6F—Conductor with strength member of locking features such as protruded round or other shaped features as well as holed out sections to promote interlocking between strength member(s) and encapsulating layer. FIG. 6G—Conductor with special shape such as contact wire in high speed rail, and the strength member can be oval or other shapes such as round. FIG. 6H—Conductor with multiple concentric layers of conductive materials (same or different types). FIG. 6I—Conductor with a hollow strength member where optical fiber or cables can be inserted inside the hollow strength member. FIG. 6J and FIG. 6K are conductors with outer layer being stranded with C or TW strand configuration. Other strand configurations such as round, S and Z can also be applied. FIG. 6L—Conductor with hollow strands to reduce weight and enlarge diameter, and such features can also be applied for the inner layers as well. FIG. 6M—Conductor with multi-layer configuration with outer layer stranded TW. FIG. 6N—Conductor with optical fiber embedded, and the location of the optical fibers can be inside the strength member or the conductive layers. Alternatively the optical fibers can be at the interface between the layers, including the interface with strength member(s). These fibers can be used for distributed optical sensing for temperature, strain, and length to get precise information on sag, mechanical load and current.

In FIG. 7A, the baseline option for a round looking conductor where the core is symmetrically and concentrically placed in the middle; FIG. 7B depicts an example of non-round conductor, where significant amount of conductive material such as aluminum, is not being forced to endure additional compression during spooling into a reel; FIG. 7C depicts an example of another non-round conductor, where the stiffer core is purposely positioned toward the lower edge to minimize the amount of conductive material such aluminum being compressed when the conductor is spooled onto a reel; FIG. 7D depicts an example of non-round conductor with a non-round strength member. This minimizes the maximum compressive stress onto the conductive material right below the strength member position, and retains full stiffness from the strength member (core) for ease of spring back during installation; FIG. 7E depicts an example of a round conductor with a non-round strength member for maximum spring back as well as minimal amount of conducting material such as aluminum under additional compression due to spooling into a reel or bending against sheave wheel during installation.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE INVENTION

The foregoing, as well as other objects of the present invention, will be further apparent from the following detailed description of the preferred embodiment of the invention, when taken together with the accompanying drawings and the description which follows set forth this invention in its preferred embodiment. However, it is contemplated that persons generally familiar with power transmission cable or conductor will be able to apply the novel characteristics of the structures or configurations illustrated and described herein in other contexts by modification of certain details. Accordingly, the drawings and description are not to be taken as restrictive on the scope of this invention, but are to be understood as broad and general teachings.

The present invention is an electrical conductor with thermal knee point substantially suppressed or reduced. Embodiments of the present invention uniquely applies pre-stress tensioning treatment and preserves the pre-tensioning of the strength member(s) in an electrical conductor with aluminum, aluminum alloy, copper or copper alloy, without relying on pre-stress conditioning of the conductor on the electric transmission or distribution towers. The aluminum layer material have electrical conductivity of at least 50% ICAS, such as at least 55% ICAS, or even at least 62% ICAS. The copper layer materials have electrical conductivity of at least 65% ICAS, such as at least 75% ICAS, or even at least 95% ICAS. The invention uniquely combines the aspects of pre-tensioning with strength members that were encapsulated with conductive media of sufficient compressive strength and thickness to substantially preserve the pre-tensioning stress in the strength member(s), while rendering the conductive media mostly tension free or in compression after conductor field installation, and preserving the low thermal expansion characteristics of the resulting encapsulated strength members.

Preferred embodiments of the present invention rely upon conductors made of two or more differing constituent materials, e.g., the strength member and an electrically conductive portion or the conductive media. The conductors resulting from this invention has an inherently lower thermal knee point. Unlike gap conductors requiring complicated installation tools and process, where the conductor, fitting, installation and repair are very expensive, the conductor in this invention is easy to install and repair, while maintaining low sag, high capacity and energy efficiency as a result of knee point shift.

Figure 1:
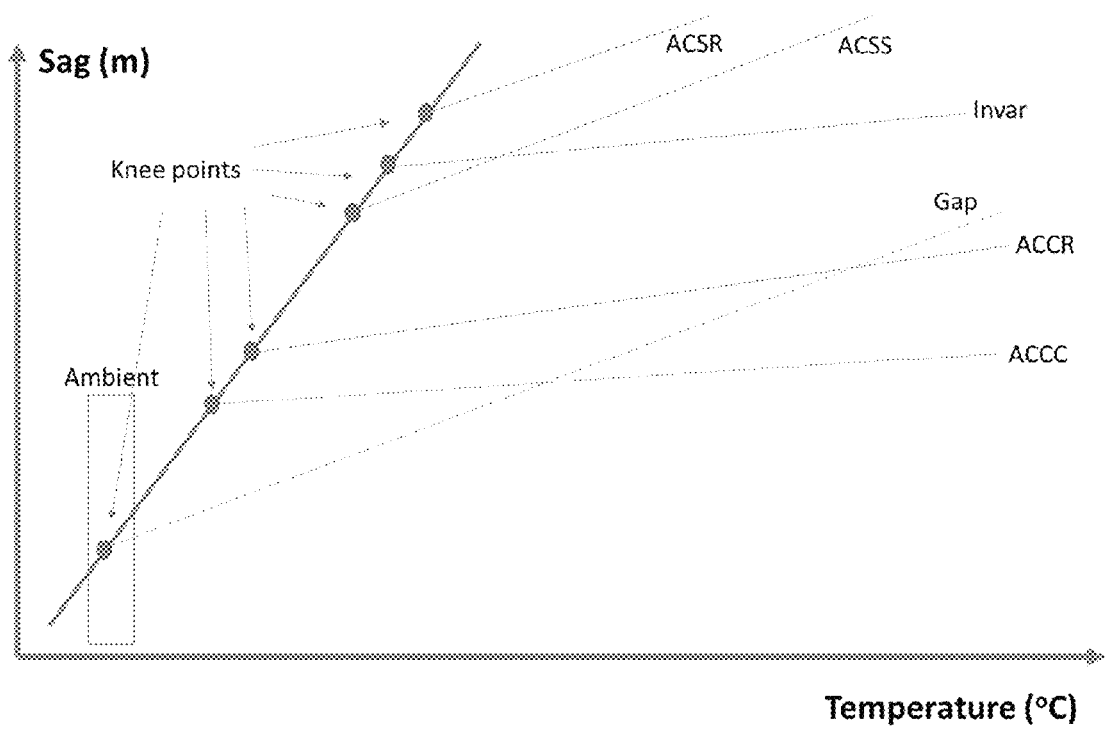
FIG. 1 is a graph of the typical thermal knee points of various aluminum conductor types. It is noted that the sag increases rapidly with temperature below the thermal knee point for each conductor type, as the aluminum material dictates the thermal expansion in the conductor below thermal knee point. Above the thermal knee points, the conductor thermal expansion is controlled by the strength members.
Figure 2:
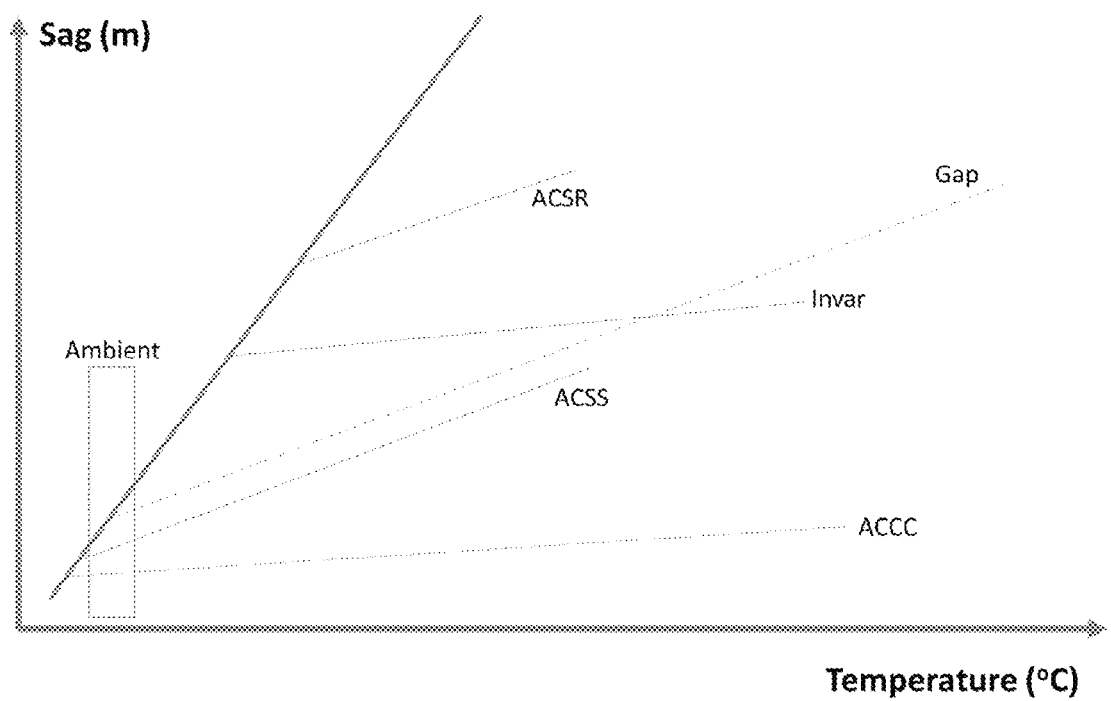
FIG. 2 is a graph of the reduction or suppression of thermal Knee point and resulting sag improvement in ACCC, ACSS, ACSR and Invar type of conductors, where the thermal knee points can be substantially below the ambient temperature after pre-tensioning. Conductor made with carbon fiber composite core, such as ACCC, offers most potential in thermal sag improvement across broad temperature range.

The embodiment applies to existing conductor types, such as ACSR; composite core conductors such as ACCR (from 3M), ACCC (from CTC Global), $C^7$ (from South wire), Lo Sag (from Nexans), multi strand core (from Tokyo Rope); ACSS; and Invar conductor, as shown in FIG. 2. Its preferred embodiment involves pre-stressed strength members encapsulated with conductive media (please note that non-conductive media may be compatible, but not preferred) in a conductor that is easy to repair, simple to install, compatible with existing low cost conventional hardware, perfect for managing ice and wind load and the effects from Aeolian vibration and galloping while delivering maximum capacity and energy efficiency. The conductive layer in immediate contact with the strength member preferably has sufficient compressive strength and thickness to support the residual tension in the strength members, and this layer can be of different material type than the rest of the conductive layers in the conductor, for example, copper or copper alloy (including copper micro alloys) in the inner most layer, and the rest of conductive layers in the conductor being aluminum or aluminum alloys; alternatively, it may be aluminum alloys or annealed aluminum or annealed aluminum alloys in the contact layer with strength member, while the rest of the conductive media being aluminum or copper, or other like combinations.

The conductor thermal knee point relates to the tension stress level of the conductive material, e.g., Aluminum or aluminum alloys, or copper and copper alloys, after installation. This temperature is defined as such that above it, the conductive media is under no tensile stress, or is in compression. The conductor thermal knee point is dependent on the conductor configuration (constituent materials and respective percentage, stringing condition such as temperature and tension, as well as load history of the conductor). For example, for the following conductors of similar size of about 25 mm in diameter, under the installation condition of 300 meter span at stringing temperature of 21° C. (except one at 5° C.), their respective thermal knee points after installation are listed in Table 1:

TABLE 1

Impact of thermal knee point from pre-tensioning treatment for typical conductors in a span of 300 meters and installation temperature of 21° C.

| | ACCC | ACSR | ACSS | STACIR | ACCR |
|---|---|---|---|---|---|
| Size | 25.15 | 25.15 | 25.38 | 25.3 | 25.55 |
| Rated Tensile Strength, RTS (KN) | 135 | 112 | 100 | 98 | 114 |
| Weight (Kg/km) | 1245 | 1301 | 1300 | 1282 | 1101 |
| DC Resistance (20 C. in Ohm/km) | 0.06717 | 0.08768 | 0.08525 | 0.08690 | 0.08283 |
| Current Capacity (max temp in ° C.) | 1624 (200) | 1003 (100) | 1589 (210) | 1509 (210) | 1509 (210) |
| Thermal Knee Point, ° C. (Stringing Tension @ 20% RTS) | 75 | 116 | 103 | 110 | 78 |

TABLE 1-continued

Impact of thermal knee point from pre-tensioning treatment for typical
conductors in a span of 300 meters and installation temperature of 21° C.

| | ACCC | ACSR | ACSS | STACIR | ACCR |
|---|---|---|---|---|---|
| Thermal Knee Point, ° C. (Stringing Tension @ 15% RTS) | 73 | 106 | 101 | 97 | 72 |
| Thermal Knee Point, ° C. (Stringing Tension @ 19.8 KN, and % RTS) | 72 (14.7% RTS) | 112 (17.6% RTS) | 103 (20% RTS) | 110 (20.3% RTS) | 75 (17.5% RTS) |
| Thermal Knee Point, ° C. (Stringing Tension @ 20% RTS; @ 5° C.) | 63 | 101 | 92 | 94 | 66 |
| Pre-Tension Treatment (equivalent to 10 mm Ice load) in KN | 29.8 | 28.6 | 24.7 | 25.5 | 30.3 |
| Thermal Knee Point, ° C. (after equivalent of 10 mm ice load) | 30 | 89 | 52 | 90 | 54 |
| Pre-Tension Treatment (equivalent to 15 mm Ice load) in KN | 35 | 35.1 | 30.2 | 31.9 | 37.4 |
| Thermal Knee Point, ° C. (after equivalent of 15 mm ice load) | 9.78 | 80 | 22 | 87 | 45 |
| Pre-Tension Treatment (equivalent to 20 mm Ice load) in KN | 40.5 | 42.3 | 36.1 | 39.1 | 45.2 |
| Thermal Knee Point, ° C. (after equivalent of 20 mm ice load) | −16 | 67 | −14 | 82 | 36 |
| Pre-Tension Treatment (equivalent to 25 mm Ice load) in KN | 45.8 | 49.9 | 42.3 | 46.8 | 53.4 |
| Thermal Knee Point, ° C. (after equivalent of 25 mm ice load) | −50 | 53 | −54 | 75 | 24 |

It is recognized in this invention that the conductors using annealed aluminum, such as ACCC and ACSS, can be easily treated with pre-tensioning (or after ice load) to significantly reduce its thermal knee point. For example, it is possible to reduce the thermal knee point to temperatures below −50° C. in conductors with carbon composite strength members where the conductor is practically insensitive throughout its operating temperature range. While it is also evident that a conductor with a carbon strength member, without pre-tension treatment, has a thermal knee point sensitive to variations in temperature and tension during installation, and prone to sag errors and variation, it is also possible to completely eliminate this issue by simply pre-tensioning the conductor (keeping the core under tension and have the aluminum under no tension or in compression). This allows conductors of this type to be used in applications where sag sensitivity to environmental changes is unacceptable, such as high speed rail applications. ACSS conductors may also be pre-tensioned to have superior performance in thermal sag (comparable to Gap conductor), however, its strength member being the steel core, and it will exhibit significantly higher thermal elongation than conductors using carbon composite strength members.

Installation temperature has an impact on thermal knee point, as shown in table 1 when the temperature drops from 21° C. to 5° C. To improve sag performance, it is common for the field engineers to reduce the installation temperature or increasing the tension (temperature shift) to accommodate creep related sag in typical ACSR conductor installations. Conductor pre-tensioning at lower temperatures should have bigger suppression of thermal knee point than conductor pre-tensioning at higher temperatures.

For conventional stranded conductors with multiple layers of conductive strands, pre-tensioning of the entire conductor in factory environment leads to permanent strand elongation and deformation among all the strands. When the pre-tensioned conductor is wrapped in a reel as typically done in a conductor stranding facility, the substantial compressive force exerted from the top and bottom layers of conductors in the conductor reel will distort the permanently stretched aluminum strands in the pre-tensioned conductors, especially the inner strands in the pre-tensioned conductor, preventing proper resettlement of all conductive strands when conductor tensile load or temperature changes, resulting in unacceptable conductor birdcaging. Factory pre-tensioning of conventional conductors also requires a clamping device on the conductors to avoid retraction of the pre-tensioned core (without it, the core will retract inside the aluminum layers), making it difficult to handle in the factory and in the field.

To avoid complex and expensive field installation associated with Gap conductor to reduce thermal knee point, and to address the birdcaging problem affiliated with conductor pre-tensioning in stranding factory, this invention uniquely establish and preserve permanent tensile strain in the strength members of the conductor, by encapsulating the strength members with the conductive material. The conductive cladding layer should be of sufficient thickness and compressive strength that substantial residual tensile strain can be preserved in the conductor to achieve low thermal knee point and low thermal sag performance in the conductor after installation.

While encapsulated strength members have been used in conductors in references 2, 3, 6, 9, 10, 11, most are not pre-tension treated and they are not intended for optimal thermal sag performance (except for reference 2), because the thermal expansion of the encapsulated strength member often has worse thermal sag as they exhibit higher thermal expansion than the strength member(s) itself. The aluminum cladding or coating applied to strength members by conductor manufacturers are typically relatively thin. They differ fundamentally from this invention: 1) they serve different purposes, not for pre-tensioning treatment and/or suppressing thermal knee point in conductors made with pre-tensioned strength member; 2) they are too thin to be relevant or applicable to this invention because preserving the high tensile stress in the strength member after pre-tensioning treatment requires encapsulating layer of sufficient thickness. For example, the aluminum coating onto the composite core by Nexans in its LO-Sag product is very thin and is for the purpose of protecting its carbon composite core from high temperature oxidation degradation.

The aluminum coating onto the composite core by Nexans in its LO-Sag product is very thin and is for the purpose of protecting its carbon composite core from high temperature oxidation degradation.

In pollution heavy regions (coastal or industrial pollution), the gaps between aluminum strands are often places for the pollutants to enter into the conductor and the steel core. All copper conductors are often used in distribution networks, especially in areas where corrosion might be a concern. Stranded conductors with aluminum encapsulated steel or Invar cores are also introduced to deal with corrosion, e.g., DeAngeli ZTACIR or Lumpi-Berndorf HACIN conductors. These conductors are not concerned with the suppression of thermal knee points in these conductors, and they are also not optimized for lowest sag at high temperature as the encapsulated core has similar or higher thermal expansion coefficient (e.g., $13 \times 10^{-6}$/C) than steel, and it uses high temperature Zr—Al alloys to compensate for the weaker invar strength, resulting in higher Knee point, non-optimal thermal sag as well as less than optimal electrical conductivity. The aluminum cladding to Invar steel by Lumpi (in its ZTACIR) and De Angeli (in its ZTACIR) are also thin (cladding area is typically limited to 20% of steel area) to avoid significant increase of thermal expansion coefficient in the strength member and for protecting the invar steel from corrosion effects, similar to alumoweld conductor where the aluminum layer on steel is preferred to be about 5% of the steel core.

In the De Andeli Sheat conductors[8], 'De Angeli Prodotti has developed a series of extremely compact conductors characterized by the complete lack of empty due to an high strength steel core covered by extrusion of a penetrating annealed aluminum sheat'. The aluminum cladding by De Angeli onto its Sheath conductor is solely for the purpose of filling the interstitial space among the round steel wires to maximize aluminum packing and electrical conductivity. The strength members in the sheath conductors were not pre-tension treated for the purpose of suppressing the conductor thermal knee point to improve thermal sag performance. The thickness is substantially thin to minimize the thermal expansion increase associated with encapsulated aluminum, and the coating thickness will not substantially support the preservation of the tension stress within the steel core after pre-tensioning treatment, and it does not suppress the thermal knee point. Although the De Angeli Sheat type conductors are applicable for high temperature application, similar to ACSS. The steel core in such conductors is only about 10 to 20% of total conductor cross section, and the interstitial spaces between the steel strands are of very small quantity, resulting in very limited gain in electrical conductivity. The conductor is not designed for optimal thermal sag performance, because the steel core encapsulated with annealed aluminum will have much higher thermal expansion than the steel core in ACSS conductors, resulting in significantly worse thermal sag above its thermal knee point at higher temperatures (e.g., $14 \times 10^{-6}$/C for 50% Al encapsulated steel vs. only $11.5 \times 10^{-6}$/C for steel).

The Pre-stretch treatment in reference 2 stretches the aluminum cladding during pre-tensioning strength member, resulting in severe tensile strength load to the cladding layer, making it vulnerable to vibration fatigue damage. Since the cladding layer is an integral part of the strength member during pre-tensioning, the resulting encapsulated strength member will be of higher thermal expansion coefficient, as explained above in aluminum clad steel or invar. Furthermore, the cladding layer was under tension, and it cannot restrain the strength member from retracting inside the conductor when tension is released, requiring clamping at the ends of the conductors. Rather than minimizing the shrinkage of the core, the severe tension endured by the aluminum cladding may contribute to the shrinkage of the core when the overall tension in core is released, exasperating the problem of core slippage/shrinkage, and pose challenges in the handling, installation and repair of such conductors.

In conclusion, the coating or aluminum cladding layer in the prior art are mostly for protecting the steel strength members, and are of relatively small cross sectional area compared to the steel core area itself as they are intended to protect steel from corrosion effects. The strength member(s) and the cladding or coating are subjected to the same stress conditioning (either no stretching, or stretched together), and the resulting hybrid strength member (with cladding or coating) is negatively impacted with higher thermal expansion coefficient than the strength member itself, leading to higher sag.

Figure 3:
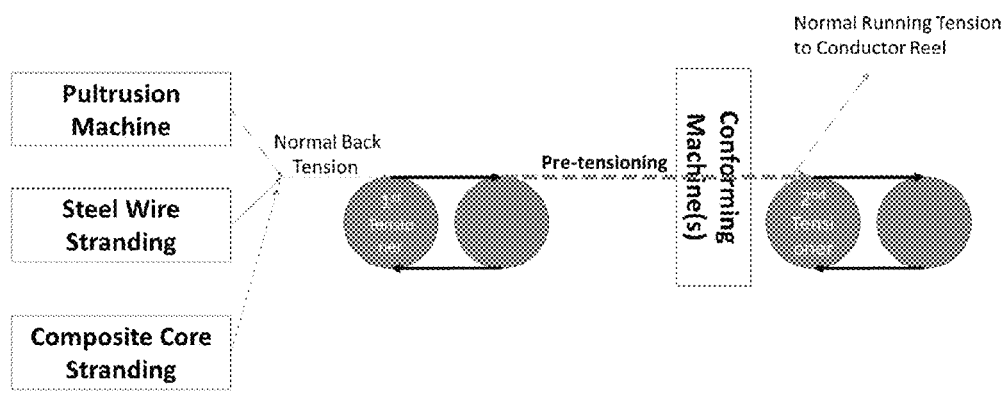
FIG. 3 is a diagram of the process of encapsulation of pre-tensioned strength member(s) while maintaining normal tension outside the pre-tensioning stage.

To avoid the increase in thermal expansion in the strength member, the encapsulation material around the strength member should be tension free or preferably under compression during and especially after pre-tensioning of the strength member. The tensioned strength member(s) for an electrical conductor can be encapsulated with conforming machine(s) in combination with a tensioning device. Metallurgical bonding between the strength members and the conductive encapsulating metal are desirable, but not required. If necessary, adhesives (such as Chemlok 250 from Lord Corp) can be applied to the surface of the conductor strength member(s) to further promote the adhesion between the strength member and the encapsulating metal layer. Additionally, surface features on the strength member(s) may be incorporated to promote interlocking between the encapsulating layer and the strength members (e.g., stranded strength members such as multi-strand composite cores in $C^7$ or steel wires in conventional conductors; pultruded composite core with protruding or depleting surface features; and an intentional rough surface on strength members such as ACCC core from CTC Global where a single or multiple strand glass or basalt or similar and other types of insulating material were wrapped around the strength member, instead of just longitudinally parallel configuration described patent[5]). The conductive encapsulating layer is preferably aluminum, aluminum alloy, copper and copper alloys, but they could also be other metals such as lead, tin, indium tin oxide, silver, gold, or nonmetallic materials with conductive particles when appropriate. FIG. 3 is an illustration of such set up. The conductive encapsulating metal are expected to soften or even melt in the conforming machine from the frictional force. If the strength member(s) is made of carbon fiber reinforced polymer matrix composite, the material glass transition temperature (Tg in thermoset composite) or melting point (thermoplastic matrix) should be sufficiently high to avoid degradation when they are in contact with conformed metals. The Tg of the material should be at least 100° C., but preferably over 150° C. This is easily achievable with polymeric matrix using epoxy resin cured with anhydride type of hardeners. The hot conformed encapsulating metal layer is expected to be chilled down to ambient or below temperatures within 60 seconds, preferably less than 20 seconds. The strength member may be a composite made with all glass fibers or all basalt fibers or a mix of the two as reinforcements, including but not limited to A glass fibers, E glass fibers, H glass fibers, S glass fibers, R glass fibers, and AR glass fibers.

It is important to note that in this invention, the encapsulating layer(s) are under no tension while the strength member(s) are pre-stretched/tensioned. After the pre-tension in the strength member is released, the encapsulating layer(s) are subjected to total compression, which minimizes the shrinking back of the strength members. The strength members, made with composite materials, may have a strength above 80 ksi, and a modulus ranging from 5 msi to 40 msi, and a CTE of about $-1 \times 10^6$ to $8 \times 10^{-6}/°$ C. Most of them, such as ACCC core, are of the modulus ranging from 15 msi to 22 msi, substantially less than typical steel wires (about 28 msi). It is ideal to apply encapsulation and pre-stress to composite strength member(s), because the tension load required may be substantially less, and the encapsulating layer(s) can more readily and effectively minimize the shrinking back in the composite strength member(s). Furthermore, the encapsulation of strength member practiced in this invention, unlike the prior art, uniquely allows the preservation of the low thermal expansion coefficient characteristics in the strength member(s), minimizing the thermal sag in the resulting conductor. With strength members properly encapsulated, including the ends with moisture resistant sealants such silicon based material, the composite strength members may be optionally made with all carbon fibers without insulating layer. This could significantly improve conductor overall performance (lighter weight, extremely low thermal expansion of at most $1 \times 10^{-6}$, higher strength, higher modulus to facilitate longer span or fewer towers, higher conductor capacity and better energy efficiency).

The conforming encapsulation step may be optionally integrated with a pultrusion machine, or a core stranding machine for steel and composite strength members where a conductor core made of plural strength member wires/strands/rods is made, to further reduce cost. Optionally, the $1^{st}$ set of tensioner might not be necessary if the preceding step, such as pultrusion process or the strength member stranding machine is capable of handling the speed and tension in the pre-tensioned conforming process or a drawing process with sufficient drawings force from the drawing side where the encapsulating material is a tube with strength member(s) inside and the assembly is drawn through a single or series of drawing dies to get the final size and configuration. The tensioning of strength member is maintained during the conforming process. The encapsulated pre-tensioned strength member passes through the $2^{nd}$ tensioner to reduce the tension level before winding into a conductor reel. If the conductor reel is capable of winding the conductor at high tension level, it is possible to skip the tension reduction step in the $2^{nd}$ tensioner. It is also possible to avoid the tensioners described if precisely controlled differential speeds in different steps along the manufacturing process are maintained. Other tensioning devices or approaches may be used in lieu of the pair of tensioners in FIG. 3. Instead of conforming machines or the like, integral tubes may be extruded over the strength member(s) or extruded profiles were folded over the strength members from a broad strip and longitudinally welded. Aluminum wires may be stranded radially around the strength members, then crushed by the application of radial pressure to bond or adhere to the strength member(s)[10]. Alternatively, tensioning of the strength member(s) is also possible by controlling the pulling speeds with differential speed in the tensioning segment only, while maintaining constant speed at the beginning and winding sections.

The level of pre-tensioning in the conductor is dependent on conductor size, conductor configuration, conductor application environment and the desirable target thermal knee point. If the goal is to have a conductor thermal knee point at or near the stringing temperature (e/g/. ambient), the tension required onto the strength member may only be about the same stringing sag tension (typically 10 to 20% rated conductor strength), plus 5-50% of the stringing sag tension level, preferably 10-30% extra to keep all aluminum (or copper in the case of copper conductors) free of tension after stringing, which is significantly lower compared to conductor pre-tensioning in the electric towers where a load about 40% of conductor tensile strength are commonly required. If lower thermal knee point is required, higher pre-tensioning stress is needed. It is also important to note that the composite core using carbon fibers are strong, light weight, low thermal sag. The encapsulated strength member(s) using fiber reinforced composite materials, is ideal where the elastic strength member(s) facilitates spring back of the encapsulated strength member(s) from the reeled configuration for field installation. In one characterization, the strength member(s) may be pre-strained by at least 0.05%, such as at least 0.15%, even at least 0.3%.

Figure 4:
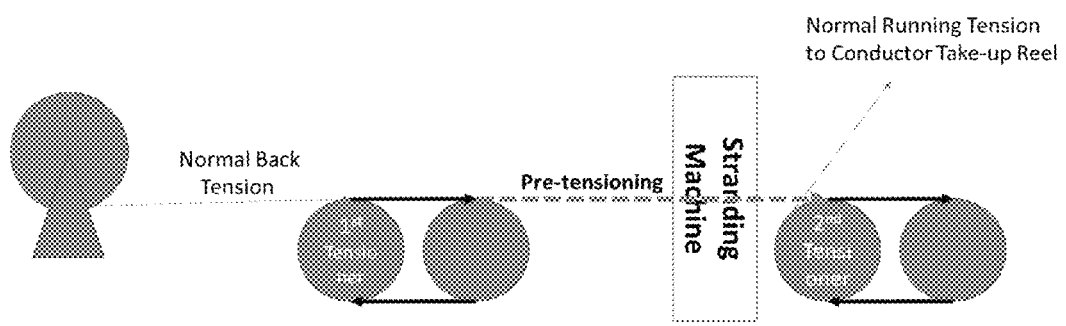
FIG. 4 is a diagram of the process of the outer layer of the conductor being stranded (round, TW, C, S, Z or other configurations are acceptable) while the encapsulated strength member is highly tensioned during the stranding operation to effectively suppress the conductor thermal knee points. It is important to note that reducing the tension to normal level before conductor take-up reel is essential to minimize distortion to conductor strands in the reel.
Figure 5:
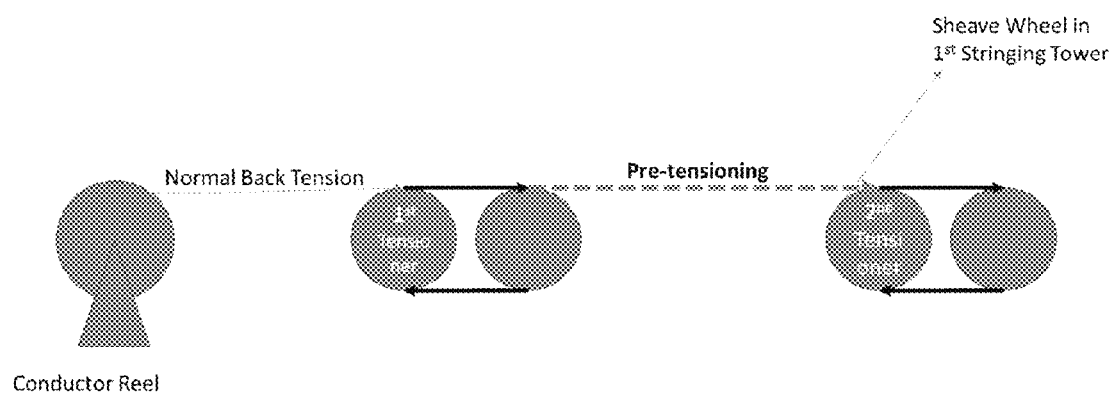
FIG. 5 is a diagram of conductor pre-tensioning in the field prior to the 1st sheave wheel during installation. The high tension is maintained between the 1st tensioner (on the left) and the 2nd tensioner (on the right). This approach is also be applicable to all conventional conductor types, such as ACCC from CTC, Lo-SAG from Nexans, C7 from Southwire, ACSR, ACSS, INVAR.
Figure 7A:
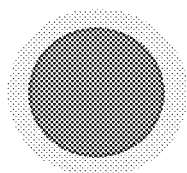
FIGS. 7A-7E depict the configuration of encapsulated core/conductors.
Figure 7B:
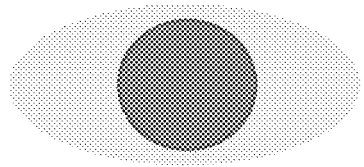
Figure 7C:
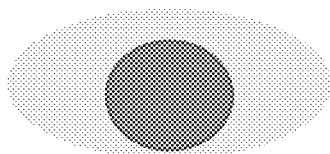
Figure 7D:
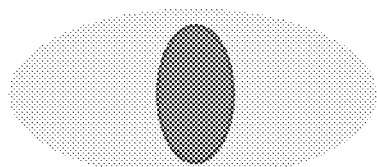
Figure 7E:
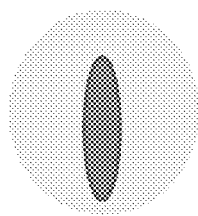

For conductors intended for AC applications where the skin effect dictates the conductive layer should be within the skin effect depth, it is preferred to have multiple concentric layers of conductive media encapsulating the strength member during conforming process. The skin depth varies with frequency. It reaches a maximum depth of about 8 mm at 60 Hz, and about 13 mm at 25 Hz for pure copper. For pure aluminum, the maximum depth is about 11 mm at 25 Hz and 17 mm at 60 Hz. Each conductive layer thickness should be less than the maximum allowable depth to achieve low A/C resistance. This could be achieved through a series of conforming machines. In one characterization, each of the copper encapsulating layer has a thickness of at most 12 mm, such as at most 10 mm, or even at most 8 mm. In another characterization, each aluminum encapsulating layer has a thickness of at most 16 mm, such as at most 12 mm, or even at most 10 mm. For highly conductive material such as copper, it is advisable to include dielectric coating in between the conductive layers or strands to optimize for skin effect. Alternatively for improved conductor flexibility, it might be preferred to keep the last layer or layers of conductive media stranded with round, TW, C, Z, S strand configurations, as implemented in the FIG. 4, where the pre-tensioned encapsulated strength member is optionally further subjected to tensioning during the stranding operation to get the outer layer of conductive media into tension free state or into compression. This can also be accomplished by pulling the electrical conductor, including the conductor in this invention where the outer most layer(s) being stranded, through a tensioner and through a plurality of travelers that are operatively supported by suspension towers, and between two deadend towers where one side conductor is attached, while the other side has the encapsulated strength member pulled out and trimmed according to a pre-specified length equivalent to strength member elongation during conductor pre-tensioning, before completing conductor deadending. This step can be further assisted by sufficient lubricants (e.g., oil or grease or other similar substance between the stranded layer and the encapsulated layer) to facilitate the relative motion between the sliding conductive layers; or alternatively, pulling the overhead electrical conductor through a pair of tensioners that can be utilized for in-field conductor pre-tensioning to significantly reduce conductor thermal knee point, as shown in FIG. 5. The steps and approached described here and in both FIGS. 4 and 5 are also directly applicable to conventional conductors such as Invar, ACSS, ACCR, ACCC, Lo Sag and $C^7$ etc, without the applying the encapsulation layer to respective strength members. Copper cladded aluminum strands or copper cladded encapsulating layer could be preferable as the currents concentrates in the copper skin layer for maximum conductivity without the cost and weight of pure copper conductor.

Pre-tensioning of the conductors implemented in FIGS. 4 and 5 are acceptable in terms of conductor birdcaging propensity. Unlike the process described in Chinese patent or in the JPS approach, the conductor only has the limited outer layer or layers being stranded. Without the issue of all conductive strands of inner layers getting distorted during compaction into a reel or handling in the field as in the Chinese patent or the JPS approach, the outer strands are relatively free to resettle without being hindered (absence of inner layer conductive strands). While the practice disclosed in FIG. 5 is applicable to conventional conductors, it does present some challenge (not as problematic as in Gap conductor) to repair such treated conductors after installation should a line breakage occurs. This is because the strength members in the core will retract inside the layers of conductive strands, and making it difficult to locate the broken strength member as well as in field tensioning of it before conductor splicing operation.

Some of the conductor configurations in this invention are illustrated in FIGS. 6A-6N. The encapsulated core can have a single strength member or a plural of strength members stranded together or loosely packed, and the strength member(s) can be round or other shapes such oval or modified round with surface features to promote adhesion or mechanical interlocking between strength member and encapsulation layer. These strength members can be made of steel, invar steel, high strength or extra high strength or ultra high strength steel, metal matrix composite reinforced by ceramic fiber, carbon fiber or other suitable fibers, continuous or discontinuous; polymeric matrix composites reinforced by carbon fibers, glass fibers, quartz, or other like types reinforced composites in either thermoset or thermoplastic matrix, with or without additional fillers including nano-additives. The reinforcement in the composites can be substantially continuous or discontinuous. There is an insulation layer between carbon composite and conductive layer, and it can be made with reinforcement fibers such as glass or basalt fibers (either substantially parallel to axial direction, or woven or braided glass) or a layer of insulation (including an insulating resin layer) or insulative coating. When the insulating layer between the encapsulating metal and carbon fiber strength member is absent, care should be taken in sealing up all exposed ends of the strength member to eliminate water ingress. The encapsulated core can also be hollow, and the hollow strength member may also contain optical fiber or cables, and may be used for transmission and distribution network (fiber to home) or optical ground wires. The conductor itself can be a single layer encapsulated strength member. The conductive layers can also be a concentrically encapsulated round perfectly smooth surface conductor, with or without the dielectric coating in between each layer. The conductive surface may have pultruded surface features to disrupt vortex shedding in the event of Aeolian vibration. The layers may have lubricants between them to facilitate some relative motion, but the contact between the conductive layer and the strength member should be strongly bonded either mechanically or chemically to ensure substantial maintenance of residual stress and strain in respective constituents. The outer layers can be stranded onto the conductor where different strand configurations are acceptable, such as round, trapezoidal, C, S, Z and other suitable shapes, and preferably self-locking strands such as Z, S and C wires where a smooth surface with substantially wind drag is attainable. Other conductor configurations are also permissible, such as tear drop shapes in high speed train contact wire applications. The conductive media can be annealed or un-annealed aluminum or aluminum alloys, copper or copper alloys, or a combination of them.

The interface between the strength member(s) and the encapsulation layer can be further optimized with surface features in the strength members enhancing interfacial locking and/or bonding between the strength member and the encapsulation to retain and preserve the stress from pre-tensioning step. This includes, not limited to protruded features on strength member surface as well as rotation of the strength member around the axial direction. Furthermore, the same features can be incorporated into the interface between subsequent conductive layers. As an example, the composite strength member(s) may have a glass fiber tow wrapped around its surface to create a screw shape or twisted surface. In one characterization, a braided or woven fiber layer is applied in the outer layer of the strength member to promote interlocking or bonding between strength member and the encapsulating metal layer. Steel wires may be shaped with similar surface features. It is also possible to achieve pre-tensioned strength members by simply pre-tension the reinforcement fibers in a matrix of conductive media such as aluminum or copper or their respective alloys. Such approach, for example, could be practiced in a conforming machine with aluminum. The reinforcement fibers are the type disclosed in the patent, such as ceramic fibers, non metallic fibers, carbon fibers, glass fibers, and others of similar types.

High temperature operation of conductors made with polymeric matrix core requires stability and performance of the matrix core after prolonged exposure to high temperatures. ACCC core from CTC Global relies on the galvanic preventative layer (i.e., glass fiber layer) for protection against oxygen ingress into carbon section. A layer of protective coating has been attempted by Nexans, Southwire and others to improve its composite core durability at high temperatures. Such coatings are typically very thin (less than 0.5 mm) to prevent oxygen ingress during high temperature operation. These coatings are quite vulnerable as it is so thin that it may not survive the sustained frictional movement between the aluminum strands against the core, and the thermal expansion mismatch may lead to the propensity of spallation of aluminum coating, exposing the core to thermal degradation. It is understood that this invention also covers strength member whose matrix constituent material is derived from preceramic polymer based precursors, where the resulting matrix is extremely temperature capable with superior resistance to oxidation or decomposition, and it may be silicon oxycarbide type of ceramic matrix or thermosetting type of resin matrix (for example, polyimide, cynate ester, BMI chemistries) with operating temperature well above 250° C. In such case, the encapsulating layer for enhanced oxidation resistance may be unnecessary.

The strength member should have a minimum level of tensile strength, for example, 600 MPa, or even at least 1600 MPa, to sustain pre-tension stress application. For metallic strength members, it is expected that the pre-tension stress will reach or exceed the proportional limit strength of the conductive material. The elongation during pre-tension stretching comprises elongating the strength members by at least 0.05% strain, such as at least 0.2% strain, or even at least 0.5% strain depending on the type of strength members and the degree of knee point reduction, and the strength member may be pre-tensioned before or after entering the conforming machine. Furthermore, the strength member is expected to endure radial compression from crimping of conventional fittings as well as radial pressure during conforming of drawing down process or folding and molding process, a minimum level of radial compressive strength is required, and a crushing strength of minimum of 3 KN in the radial direction is required, preferably, it is above 15 KN, or even at least 25 KN, especially for composite cores with little to no plastic deformation.

It is to be understood, however, that the present invention is not limited to the foregoing examples of wire or conductors and the methodologies of shifting conductor thermal knee point, and that variations of the above described component and material parameters, technical specifications, and criteria concerning the construction of conductor and the shifting of conductor knee point of the present invention can be made without departing from the teachings of the present invention.

The following non-limiting application examples are illustrative of the present invention and are not to be construed as limiting the scope thereof in any manner. All the conductor options and configurations based on this invention, some of them are depicted in FIGS. 6A-6N, are applicable to the following application examples, and the benefits from each example are substantially applicable to other application areas.

Example 1

Application for Reconductoring Applications in Transmission and Distribution Grid Transmission line reconductoring is typically in voltage ranging from 110 kv to 500 kv, where existing towers are leveraged as much as possible to reduce project cost and power outage time. Reconductoring may also be done live line, where no outage is scheduled during reconductoring. The primary focus of reconductoring is to maximize line capacity within established clearance constraint and to leverage existing infrastructure. The conductor from this invention is ideal for such application, where the highest packing density in the conductor (almost 100% for the concentric layers, vs typically 93% fill factor in a tightly stranded conductor such as ACCC conductor from CTC Global) will provide the new conductors with highest possible capacity (and lowest resistance and lowest line loss) at normal operating conditions. For emergency conditions, where the conductor is exposed to high temperatures, the conductor from this invention is uniquely suited as its strength member is shielded and protected from oxygen ingress and thermal degradation, allowing the conductors to be operated in its full temperature range for many years. The invented conductor with concentric encapsulation is not prone to birdcaging effects which often expose the strength member directly to effects from the environment such as UV, moisture, ozone in typical conductors. The metal encapsulation onto the strength member also effectively shield the strength members from harmful effects from these environmental factors. It should be noted that one does not need to apply compressive stress treatment to the conductive encapsulating layer to achieve the above mentioned benefit of protecting the strength member from degradation from the environment (e.g., oxygen, ozone, corona, and moisture etc.)

Reducing the thermal knee point in such conductors will significantly reduce thermal sag constraints (where the conductor thermal sag is not limited or influenced by the conductive material with high thermal expansion coefficient such as aluminum or copper or their respective alloys). The low thermal knee point also removes the sensitivity of high temperature conductors with fully annealed aluminum where aluminum creep in such conductors are fast and significant, resulting in uncertainty on conductor final knee point and conductor sag[6,7]. With aluminum in no tension or under compression, creep of aluminum is completely taken out in such conductors, and the conductor settles into its final sag condition after stringing (no creep effect, provided there is also no ice load conditions is not extreme that further reduces thermal knee point). This allows the conductor to be installed with highest clearance while within tower load limit (desirable to maximize capacity and manage extreme ice load). It also significantly simplifies the installation process and sag variability in high temperature conductors, especially in bundled phase conductors. The predictable low sag helps the utility to manage its transmission asset efficiently because thermal sag is never going to be the limiting factor for emergency planning.

Conductive material in a conductor is typically the fatigue constraint in conductor life. With these constituents under substantially no tension in the conductor associated with this invention, Aeolian vibration can be effectively managed, and there might be no need for vibration dampers where the previous line may have required, saving project cost. If the design engineer desires extra protection against Aeolian vibration fatigue damage, dampers such as stock-bridge type or the Spiral vibration rods can be considered. Conductor with a special protruded surface feature as depicted in FIGS. 6A-6N, may be deployed to further manage Aeolian vibration. For large and heavy conductor types from this invention, additional damping mechanism such as dummy conductor segments attached to the conductor, with differing segment length between conductor attachment points to handle all the frequency ranges.

Hardware for newer types of conductors tends to be expensive as special and expensive mechanism to lock onto the core without crushing it had to be considered[11]. With this invention, the strength members are naturally shielded by a layer of conductive material, and this allows compatibility with conventional hardware crimping process where the fittings are directly crimped to strength members for mechanical load transfer. This may be essential for conductors with plural of strength members, such as the composite strength members in $C^7$, Tokyo rope and ACCR types of conductors to avoid excessively pinging and damaging the contact areas between the plural strength members.

Most conductors when installed new, tend to be noisy due to corona effect in high voltage lines. With the hermetical round surface in the newly invented conductor, lubricants used in the typical conductor stranding operation are not necessary, eliminating the noise effect typically associated with new conductor.

Strength members made from unidirectional fiber reinforced composite (ACCC, ACCR, $C^7$, Lo-Sag, Tokyo Rope, etc) tends to be brittle, and vulnerable to fiber breakage from excessive axial compression as a result of mishandling[6]. The encapsulating layers not only shield the strength members from direct damage during mishandling, it also makes the effective diameter of the strength member (i.e., the outside diameter of the encapsulation layer) much bigger to mitigate sharp angle occurrence. With the permanent tensile strain and tensile stress present in the strength member, it has a build-in mechanism to mitigate the compressive stress from bending that is most vulnerable to these conductor strength members, making the handling of the new conductors robust, accident proof, and cost effective. It should be noted that installation mishandling or conductor damage to the conductor in this invention, if happens, do not lead to core slippage, and may be easily repaired, unlike pre-tension treated conductors such as Gap conductors, where the strength members retract inside the conductor after damage, resulting in expensive and time consuming repair operation. It is well suited for regions where conductor stringing condition is not ideal (such as tough terrain, inexperienced labor and inadequate equipment).

Example 2

Application for New Build Applications in Transmission and Distribution Grid

New build projects often are more sensitive to materials and labor cost (e.g., conductor cost, fitting cost as well as tower cost). Some of the new builds are for long distance transmission and ultra-high voltage where corona effect must be controlled and conductor resistance and line loss must be minimized.

The embodiment in the invention include the option of stranding around the encapsulated pre-tensioned strength member(s) with additional layer(s) of conductive strands to increase conductor diameter for UHV applications while facilitating easy handling (requiring smaller reels for wrapping). For aluminum conductors in AC circuit of 60 Hz, the skin effect requires a maximum conducting layer thickness to be 17 mm. Large conductors must consider multi-layer configuration. Since significant amount of aluminum have already been pre-stressed under compression, the load and the time required to put the additional layers of conductive strands in compression or tension free are quite simpler. This will reduce the tendency of birdcaging in the conductors. The additional pre-tensioning can be implemented as suggested in FIGS. 4 and 5 if needed, or using differential trimming of the strength member suggested in this invention. The additional conductive layers can be aluminum, annealed aluminum, aluminum alloys, copper or copper alloys, or other type of conductive media. The preferred embodiment is aluminum or aluminum alloy that can take more compression (without readily bulging outward under compression), and they might also be more scratch resistant than fully annealed aluminum to preserve conductor surface integrity against mishaps from tough field conditions or erosion against the erosive kite strings caught on high voltage lines.

With the conductor thermal knee point suppressed and the conductive media such as aluminum under no tension (or under compression) when the conductor is operated above its thermal knee point, the conductor should have superior self-damping, making it possible to leverage high erection tension, such as 25-40% RTS (as compared to typical erection tension of 10-20% RTS). This not only reduces the transmission line's propensity to galloping (galloping is very damaging to power line, but very difficult to manage as the causes are different for different regions), it also allows best possible conductor ground clearance that can be leveraged to reduce tower height or longer spans with fewer towers for project cost savings. With the compact configuration, it provides the option for maximum packing of most conductive aluminum (e.g., fully annealed) in the conductor for highest capacity and lowest line loss with better energy efficiency than the best conductors available such as ACCC due to higher fill factors enabled in this invention. The conductor with its thermal knee point sufficiently reduced to below its stringing temperature, makes its installation process simple and cost effective, where consistency in conductor sagging can be easily obtained regardless minor changes and variation in stringing practice, and thus is preferable for phase conductors, especially in bundled configurations.

To manage corona in EHV and UHV applications, conductors with hollow cores or hollow strands or enlarged cross section might be used. To further minimize the corona, a hydrophilic surface treatment could be applied to the outer layer aluminum surface to avoid water beads. Low cost fitting options with conventional tools can be readily applied to the invented conductor as the encapsulated strength member(s) are much more robust and are fully compatible for direct crimping press, and the transmission line should have higher safety & reliability because the strength members are well protected with the encapsulation layer against mishandling and environmental effects (e.g., conductor damage, corrosion, UV, Ozone, moisture, etc). To minimize scratches onto conductor surface, the conductor outer layer may consider hard aluminum, aluminum alloys or copper alloys for high voltage applications where corona from conductor damage is important, because the surface, compared to annealed aluminum, is more robust against surface scratching or erosion from abrasive objects such as kite string.

Example 3

Application for Special Situations: River Crossing and Ultra-Long Span, Heavy Ice and Corrosion Heavy Regions River crossing or ultra-long span applications or heavy ice regions have the same need of compact conductors with high strength and modulus. If the transmission project is thermal sag constrained, partial or full thermal knee point suppression is desirable. If the transmission line sag clearance is driven by the ice load or weight of the conductor, it is desirable to use high strength light weight fiber reinforced composite strength member (s), and 1) either to leverage some or most of the aluminum alloy (such as Aluminum Zirconium alloys, 6201-T81) or copper and copper alloys in load carrying to minimize sag (with less suppression in conductor thermal knee point, i.e., the additional layers of conducting material (beyond the pre-tensioned encapsulating layer with the strength member) is not subjected to additional pre-tension treatment) or 2) to pre-tension the conductor sufficiently that approximates the design ice load such that the conductor can be erected at high tensions with maximum clearance without excessive load to tower. This requires the strength members to be elongated at least 0.1%, preferably at least 0.25%, or even at least 0.35%. This is important as Aeolian vibration is often critical in the long span applications and having the conductor with substantially suppressed thermal knee point (e.g., knee point reduction greater than 30° C.) that reduces the knee point below the typical temperature when Aeolian vibration occurs most often in winter seasons, will maximize self-damping in the conductor strands. The compact nature and smooth profile such as the hermetic concentric surface conductive layer would minimize ice accumulation and substantially reduces the wind load. If the conductor is of sufficient size that additional stranded conductive layer is needed on the outside, strand configuration such as Z, TW, C and S are preferred as they reduce wind load. Detection of conductor damage and real time monitoring conductor precise sag condition, conductor temperature and conductor tension on these critical transmission spans can be preferably accomplished by incorporating single or plural optical fiber(s) into the interface between the strength member and the $1^{st}$ encapsulating layer (with the optical fiber preferably untensioned to preserve the life of optical sensing fibers). These distributed sensing optical fibers may also be introduced between the conductive layers or inside the conductive layer itself and the strength member themselves, as depicted in FIGS. 6A-6N.

The invented conductor is particularly suitable for regions where corrosion and/or erosion exist. With the conductor surface being completely closed, there is no pathway for the pollutants or abrasive sands or particles to get inside the conductor, which is common in conventional conductor where the spacing between strands are easy pathway, leading to corrosion inside the conductor. For strength members being of metallic nature, the encapsulating conductive material completely shield it from the environment and is immune from corrosion. The conductor from this invention is perfectly suited for areas with heavy pollution or near coastal areas or in desert environment with frequent sand storms. This does not necessarily require the encapsulating layer to be compression treated.

When the conductor application is insensitive to the thermal knee point of the conductor, but it requires compatibility with low cost hardware and ease of installation and repair, the pre-tension step in the conductor manufacturing process is not required, but optional and preferred because an application driven by ice load or conductor weight often uses aluminum alloys which drives up thermal knee point substantially. Appropriately reducing the thermal knee point to below the typical every day condition helps to manage Aeolian vibration as well as thermal sag should it require high capacity to deal with N-1 or N-2 emergency, while at the same time, the knee point is not substantially reduced (i.e., above the temperature when the extreme heavy ice event might occur) such that when extreme heavy ice hits, the conductor has the aluminum alloy contributing in the load carrying and managing ice load sag when needed.

Example 4

Application for Distribution and OPGW Applications

Electric distribution lines do not involve corona as they operate below 110 KV. The conductors can be bare or insulated. The typical current density in the distribution conductors is much higher (2-4× of the transmission conductor), and line loss and energy efficiency would be very relevant and important. Cost for conductor and fitting as well as installation are critical in distribution lines. There are often capacity constraints in the distribution lines, where N−1 or N−2 emergencies will require high conductor capacities when needed. For AC circuits at 60 Hz, the skin effect depth for aluminum conductor is 16.9 mm and 8.5 mm for copper conductors. The conductor from this invention using encapsulated strength member(s) is ideally suited for the distribution network: a) it is compact with a fill factor approaching 100%, minimizing resistance and line loss while maximizing line capacity. With conductor thermal knee point substantially reduced as a result of pre-tensioning strength member(s), there is virtually no thermal sag with carbon fiber composite strength members, and the thermal sag would also be very manageable even with steel strength member(s) in the conductor construction. The relatively small radius of the compact distribution conductor facilitate simple wrapping into the conductor reel, yet large enough to provide protection against damage to the strength member in the conductor from mishandling, especially sharp angle. Stranded conductors using small composite strength member(s) have very robust bend radius, however, it is most vulnerable to sharp angle events where the composite strength member could be subjected to extremely small radius at the point of sharp bending, causing excessive axial compressive stress and fiber buckling failure. To improve compressive strength in the strength member, one may consider the use of siloxane derived stiff polymeric matrix or ceramic matrix, or include fillers with high stiffness such as glass or ceramic materials including hollow glass or ceramic powders with high compressive strength. In one characterization, the strength member matrix phase may include inorganic or organic fillers, including nano fillers. For distribution conductors in this invention, especially those using carbon composite strength member(s), the pre-tensioning and preservation of the tensile stress in the strength member mitigates the dangerous axial compression that leads to fiber buckling. The encapsulating conductive layer also eliminates the possibility of composite strength member being subjected to extreme sharp angle inside the conductor that leads to dangerous axial compressive load. Furthermore, conductor mishandling such as subjecting to sharp angle, can be detected by examining damage onto the encapsulating metal where permanent deformation on the tension side and groove on the compressing side could be easily observed. This invention also eliminates the risk of birdcaging as there are no need for separate strands, and the strength member is protected from moisture, UV, oxygen ingress that can all have an impact to the conductor life. With the conductor encapsulated, it is easily compatible with existing fitting and conventional compaction practice in deadending or splice. The compact structure in the conductor also make it suitable for deadending or splicing with the low cost MaClean splice and deadend fittings by simply inserting the conductor or with simple helical fittings from PLP or the like (i.e., conductive rod with strength member under pre-tension) to complete the splicing step, which makes field repair efficient and cost effective. Alternatively, the conductor from this invention may be spliced by applying preformed wires made by companies such as PLP for cost effective deployment. Crimping using DMC crimping device may be also preferable as the invented conductor has sufficient integrity and compression strength to be compatible with DMC crimping clamps. For insulated distribution conductors, the conventional insulation layer may be readily applied, and insulating material options include but not limited to polyethylene, crosslinked polyethylene, PVC, Teflon, and silicon based materials. For higher temperature operation well beyond 100 C with the insulated conductor, silicone material such as siloxane based chemistry may be preferred. Silicon based material are commonly used as insulator materials, with superior insulation and UV resistance. The softness of silicone materials may be adjusted by incorporating organic or inorganic fillers. Alternatively, it could be pultruded or extruded or compression molded into insulating jackets around the conductor using continuous or discontinuous fibers such as glass or basalt fibers to achieve adequate electrical resistance as well as robustness against clashing among phased conductors.

Besides low cost, robust against mishandling as well as high capacity (at normal and high temperatures), the conductor from this invention (i.e., New-Al) has one of the best energy efficiency. For example, in the following distribution conductors in Table II, the conductor from this invention has similar outside diameter to other conductor types. The conductor in this invention is of high strength and low electrical resistance. It runs cooler among the four distribution options with the highest capacity (almost double that of AAAC), and lowest line loss. Assuming a wholesale electricity price of $100/MWhr, the invention would be 10% more efficient than comparably sized ACCC, 25% better efficiency than comparably sized AAAC. Annually, the conductor from the invention saves about $1.85 per meter compared to comparably sized ACCC, and it is worth $6.8 per meter extra due to line loss savings as compared to comparably sized AAAC. For heavy ice regions (e.g., 30 mm ice) where the conductor is also spanned longer distance (e.g., 200 meters), the conductor from this invention (i.e., New-AlZr) with the aluminum alloy option is also best for minimizing line sag. The low cost, high capacity, highly energy efficient distribution conductor disclosed in this invention also effectively address the issue of outage from lightening damage to conventional distribution conductors (often without ground wire protection), as lightning strike to the new conductors will not lead to conductor breakage and line outage.

TABLE II

| Distribution conductor comparison of comparable conductor size | | | | | |
|---|---|---|---|---|---|
| | ACCC | ACSR | AAAC | New-Al | New-AlZr |
| Aluminum Area (mm²) | 123 | 105 | 119 | 134 | 134 |
| OD (mm) | 14.35 | 14.16 | 13.95 | 14.35 | 14.35 |
| Rated Tensile Strength (KN) | 67 | 36 | 31 | 68 | 81 |

TABLE II-continued

Distribution conductor comparison of comparable conductor size

|  | ACCC | ACSR | AAAC | New-Al | New-AlZr |
|---|---|---|---|---|---|
| AC Resistance (@ 25° C.) | 0.2335 | 0.2748 | 0.28165 | 0.21466 | 0.22638 |
| Capacity A (Temp in ° C.) | 742 (200) | 446 (90) | 439 (90) | 776 (200) | 771 (200) |
| Temperature ° C. @400 A | 69 | 77 | 79 | 65 | 67 |
| Line loss (MWhr/km @ 400 A, 110 KV, 70% load) | 1201 | 1452 | 1496 | 1090 | 1137 |
| Line Loss Saving Benefit ($/m/yr, assuming $100/MWhr) | Baseline | −$ 4.19 | −$ 4.93 | $ 1.85 | $ 1.06 |
| Design Sag (30 mm Ice, 200 m span, Stringing @15% RTS and 21 C.) | 8 m | 8.63 m | 7.85 m | 8.05 m | 6.71 m |
| Design Sag (10 mm ice, 100 m span, stringing @15% RTS and 21 C.) | 1.12 m Ice | 2.2 m (90 C.) | 2.32 m (90 C.) | 1.13 m Ice | 1.17 Ice |

Distribution lines are also considered for delivering fibers to home. Using the hollow core conductor (pre-tensioned) and the core is filled up with un-tensioned optical fiber cable, the utility has a much cheaper way to facilitate 'fiber to home' strategy. For OPGW applications where the phase conductor from the current invention will have virtually no extra sag, the product in this invention of using hollow encapsulated strength member is very desirable as it also solves a problem of unequal sag from the ground wire vs the phase wires if the phase conductors are of a different type of strength member(s). Fibers or fiber cable(s) inside the hollow core could be either used to continuously monitor the temperature, load, current, tension, or alternatively, the optical fibers are used for primarily optical communications (by the telecommunication companies).

Example 5

Application to High Speed Train System

Contact wires (i.e., catenary wire) in high speed trains are kept at a mechanical tension because the pantograph causes mechanical oscillations in the wire and the wave must travel faster than the train to avoid producing standing waves that would cause wire breakage. Tensioning the line makes waves travel faster because the speed of train is limited by the square root of the tension over weight ratio in the contact wire. This requires high strength copper wires that is either low in conductivity (Copper Magnesium alloy 0.5% Mg) or environmentally unsuitable (cadmium copper alloy). For medium and high speed train systems, mechanism for maintaining very high wire tension is deployed to maintain contact wire straightness along the high speed rail track. As the environmental temperature changes, both the messenger wire and the contact wire expand or shrink accordingly, resulting in undesirable wire sag. These dimensional changes in the messenger wire and contact wire are often problematic for achieving and maintaining high train speed, requiring expensive frequent adjustment and maintenance. The wires are generally tensioned by weights or occasionally by hydraulic tensioners to ensure that the tension and wire sag are virtually independent of temperature. Tensions are typically between 9 and 20 KN per wire. Where weights are used, they slide up and down on a rod or tube attached to the mast, to prevent them from swaying. Such constant tensioning mechanism is expensive to maintain, and also very expensive to upgrade if the train speed needs to be increased.

This invention is perfectly suited to high speed rail applications where the sag from thermal expansion of messenger wire and contact wire made of copper or copper alloys must be tightly controlled. By encapsulating the copper or copper alloys around carbon fiber reinforced strength member(s) through conforming machine(s) as described in this invention, one could make the messenger wire and contact wire virtually immune to environmental temperature variations. If A/C current is used, the depth of skin effect in copper is about 13.2 mm at 25 Hz. A conductor with single copper layer encapsulated strength member should be adequate for most applications. For conductors requiring substantially more conducting cross sectional area, one may consider using multiple layers of copper or copper alloy or with outer layer being stranded with Z, TW, Round, S or C type of strands for compactness to reduce wind and ice load as well as maximum conductivity and lowest resistance. Each layer of copper or copper strands should be treated with dielectric material to accommodate skin effect in the conductor if necessary. The encapsulated strength member(s) is pre-tensioned such that its thermal knee point is below the lowest operating temperature for the train service, thereby, the messenger wires and contact wires maintain constant length and sag as they are immune to environmental temperature effects. Unlike gap conductors that might also achieve low thermal sag but impossible for field repair, the encapsulated messenger wires and contact wires with carbon fiber composites can be easily repaired because the core and the copper layer are an integral part of the conductors. The low thermal expansion composite strength member(s) is constrained from retraction (unlike conductor of gap design) by the encapsulating copper or copper alloy layer at the event of wire damage, and the conductor can be easily repaired on the spot.

A copper messenger wire made with encapsulated carbon fiber composite core with substantially reduced thermal knee point, could eliminate the need for the weight or hydraulic tensioners. For example, a 25 KN force would be sufficient to suppress the thermal knee point to below −25° C. for a messenger wire with the OD of 14.8 mm and a carbon composite core at 9.0 mm. The contact wire made with carbon composite strength member could enable much higher speed (i.e., high catenary constant). For example, a contact wire with 30% carbon composite core (2400 MPa strength, and 1.9 g/cc density) and 70% annealed copper (210 MPa and 8.96 g/cc density) have a strength of 867 Mpa at a density of 6.84, a strength to density ratio of 127, which is over 100% higher than the strength to density ratio for Copper Mg alloys (0.5%) at 60. This can be further improved by combining copper micro alloy (La Farga, 99.8% Copper, 99% ICAS conductivity, 480 MPa strength, Density of 8.96) and carbon composite core using carbon composite (3500 MPa and 1.76 density) using latest carbon fiber from Toray (T1100 with 45 msi modulus and greater than 1000 ksi strength). The strength to density ratio can reach 204 for a contact wire with 30% carbon composite core (1386 MPa strength and 6.8 g/cc density), making it possible to reach for higher speed not possible with current technology. The invention also makes it possible to consider aluminum or aluminum alloy encapsulated strength member with low CTE, such as strength members made by CTC Global, Nexans, or Southwire or variations of them, for messenger and contact wire applications. For example, the strength to weight ratio in a hybrid wire using 70% anneal aluminum (60 MPa strength, 2.7 g/cc density) and 30% carbon fiber composite (1.76 g/cc density, 3500 MPa strength) is over 400. For better performance in wear, corrosion and contact resistance, one may consider coating a layer of copper onto the aluminum or aluminum alloys, for example, through electroplating or plasma coating or other means. The copper layer of sufficient thickness, if required, may also be added using a conforming machine described in the invention. Furthermore, both messenger wires and contact wires may be made by using Invar steel as strength member(s) and copper or copper alloys (or aluminum and aluminum alloys or copper cladded aluminum) with the conductive media under compression or under no tension while strength member is under tension, to take advantage of the low thermal expansion coefficient of Invar materials. It is also possible to insert low CTE reinforcement wires of fibers such as carbon or Invar steel wires under pre-tension condition, directly in the conductive media materials such as copper, aluminum, or their alloys or hybrids or other similarly conductive media, with resulting conductive materials under compression or under no tension while the reinforcement wires or fibers are under tension. The reduced thermal expansion coefficient and higher conductor modulus, coupled with the knee point reduction, makes it easier to manage sag variation from environmental temperature changes and/or ice or wind events. It is also attractive that low cost messenger wire and contact wire system using aluminum and carbon composite core with low CTE is broadly used to replace the current copper system in all electrified trains or other railed vehicles. It should be noted that the encapsulated composite strength member might be made with mostly carbon fiber reinforcement when exposed ends are properly sealed from moisture ingress. This provides maximum benefit in terms of reducing weight, increasing strength and modulus, decreasing thermal expansion coefficient. In one characterization, the resulting conducting wire has a strength to density ratio of at least 70 MPa/g/cc, such as at least 150 MPa/g/cc, or even at least 180 MPa/g/cc. In some characterization, the strength member in the conductor has a strength of at least about 2000 MPa, such as at least 3000 MPa, even at least 3600 MPa, a thermal expansion coefficient of at most $12\times10^{-6}$/C, such as at most $6\times10^{-6}$/C, or even at most $1\times10^{-6}$/C.

Furthermore, with the copper under compression and is largely unaffected by tension fatigue, the encapsulated copper contact wire and messenger wire should exhibit exceptional fatigue life as the carbon composite core is one of the best materials in fatigue performance. Additionally, the copper encapsulated composite core conductor can be easily repaired (no possibility of core shrinkage and retraction, that might happen inside a copper gap conductor made of similar materials). Furthermore, the hardware conventionally used for copper conductors can be applied to this invention (e.g., copper conductor with encapsulated carbon composite strength members with suppressed knee point), reducing the system cost. The installation of the conductor should also be quite straight forward, unlike a copper gap conductor using carbon composites, where grease inside the conductor might be needed and the installation is very time consuming and involves very high tension in the field. The copper encapsulated carbon composite core conductor solution with pre-tension treatment is ideal for high speed rail application as both messenger wire and contact wires whose sag are virtually immune to environmental temperature change, the conductor installation and repair are simple and cost effective, and the fatigue life is superior and the tension to density ratio can be 200% better than existing best options (Copper Mg alloy) to facilitate higher train speed. This solution from the invention should be attractive for both new build high speed rail as well as reconductoring high speed rails. It should be noted that round copper or alloys can still be used with this invention where the fill factor in the conductor might be in the 70% range, but ideally, the copper should have packing density of approaching 100% for low energy loss as well as minimizing ice or wind load to the messenger and contact wires.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

REFERENCES

1) CN102103896A: Highly conductive heat-resistant aluminum conductor and the production process thereof, Haoshi Huang, Jun. 12, 2011.

2) Ishihara et al., Development of New Type Low Sag Conductor Increased in Capacity, T. IEE Japan, Vol. 122-B, No. 12, pp. 1458-1463, 2002.
3) EP 2367247 A1: Method for laying overhead lines for high voltage overhead lines (lumpi), P Fiers and H Pohlmann, Mar. 20, 2010.
4) U.S. Pat. No. 6,447,927 B1: Fiber reinforced aluminum matrix composite, C McCullough et al., Hune 21, 1995.
5) U.S. Pat. No. 7,368,162 B2: Aluminum Conductor composite core reinforced cable and method of manufacture, C Hiel and G Korzienowski, Apr. 23, 2002.
6) WO 2010089500 A1: High Voltage electric transmission cable, S Barbeau et al., Feb. 3, 2009.
7) Engineering transmission lines with high capacity low sag ACCC conductors, $1^{st}$ edition, 2011 (ISBN #978-0-615-57959-7).
8) X Meng and Y Dai, 'Discussion on the initial elongation of carbon fiber composite core conductor', Optical Fiber & Electric Cable, No. 6, 2011. Pp 8-11.
9) EP1821218 A2: Conductor cable for electric lines (deAngeli), M Handel, Feb. 17, 2006.
10) U.S. Pat. No. 7,228,627 B1: Method of manufacturing a high strength aluminum-clad steel strand core wire for ACSR power transmission cable, H Yoshimura, T J Higham, and H T Jarboe, Dec. 16, 2005.
11) U.S. Pat. No. 3,813,772A: Method of forming steel supported aluminum overhead conductors, H Adams, Jun. 30, 1970.
12) U.S. Pat. No. 7,019,217: A collet-type splice and dead end for use with an aluminum conductor composite core reinforced cable, D Bryant, Oct. 22, 2003.

What is claimed is:

1. An electrical conductor, comprising: a strength member comprising a strand or a plurality of strands of steel or fiber-reinforced longitudinally extending composite materials under tensile strain of at least 0.05%, and having an optional insulation layer sufficient to eliminate galvanic corrosion; and an electrically conductive encapsulating layer portion comprising of at least a single layer of cladding conductive media, wherein the conductive encapsulating layer is in direct contact with the strength member with no gaps; or the conductive encapsulating layer is in direct contact with the strength member via a lubricating layer with no gaps between any of the three layers; and wherein the electrically conductive encapsulating layer portion is substantially free of tension, for electrical conduction and protection of the strength member from damage or material degradation.

2. The electrical conductor of claim 1, wherein the electrically conductive encapsulating layer portion comprises one of Aluminum, Aluminum alloys, Copper and copper alloys; and
a plurality of layers of concentric conductive media or multiple layers of conductive strands.

3. The electrical conductor of claim 1, wherein the strength member comprises substantially continuous reinforcing fibers, such as carbon fibers or ceramic fibers, with an optional insulating layer made of glass fibers or basalt fibers or other suitable insulating layer such as resin layer, in a binding matrix comprising one of thermoplastic or thermoset types or metallic or ceramic matrix with optional organic or inorganic fillers;
wherein the electrically conductive encapsulating layer portion comprises:
an aluminum conducting layer, such as hard aluminum, aluminum alloys, or partially or fully annealed aluminum; or
a copper layer comprising of copper or copper alloys or copper micro alloys;
wherein, the strength member is selected from being solid, or being hollow and used as a conduit for optical fibers such as in ground wires or distribution conductor applications.

4. The electrical conductor of claim 1, wherein the electrically conductive encapsulating layer portion is at least one layer, and comprises one or more layers of concentric tubes or conductive aluminum or copper strands distributed around the electrically conductive portion;
wherein the layers of concentric tubes or strands encapsulate the strength member and wherein:
the strength members are pre-strained by at least about 0.02% before a first sheave wheel during conductor field stringing;
the strength member has a coefficient of thermal expansion of not greater than about $12 \times 10^{-6}$ m/m/° C.;
the strength member has a radial crush resistance of at least 3 KN to avoid damage to the strength member during hardware clamping, and the resulting electrical conductor has a length of at least 500 m.

5. The electrical conductor of claim 1, wherein some or each of the strands have surface features for interlocking or bonding between strength members and an encapsulating layer; wherein the surface features are one of protruded or depleting surface features, a braided or woven fiber layer or an outer layer in the strength member wrapped with fiber tow(s) not parallel with a majority of reinforcement fiber orientation; and
wherein an outer layer of the electrically conductive encapsulating layer portion, beyond the strength member, is of a shape selected from the group comprising: trapezoidal, Z, S, C or round shaped strands or a combination of said shapes, in addition to the layers of tubes.

6. A method of detecting damage to the electrical conductor of claim 1, wherein the strength members are sufficiently protected from sharp angles where brittle axial compression damage typically occurs, comprising examining damage on the electrically conductive encapsulating layer portion by observing permanent deformation on a tension side, and a grove on a compression side.

7. The electrical conductor of claim 1:
wherein the conductor is well suited for electric distribution applications of less than 110 kv including insulated conductors where similar stringing tools and hardware approaches can be safely deployed, and a higher packing density of aluminum or copper delivers a highest possible current capacity while minimizing line loss;
wherein the conductor is made with aluminum alloys or copper or copper alloys, including copper micro alloys; and high strength and light weight fiber reinforced composite strength members that are particularly suited for long span or heavy ice applications where high strength to weight ratio in the conductor is desirable, and thermal sag is well managed by conductor pre-tensioning;
wherein a smooth surface and compact configuration of the conductor minimizes wind or ice load, and the strength members can be leveraged at high operating temperatures due to virtually no exposure to oxidation or environmental degradation, such as UV or ozone or moisture;
wherein the conductor is perfectly suited for areas with heavy pollution or near coastal areas or in a desert environment with sand storms as the conductor and its strength member(s) are well shielded by a hermetic round smooth surface.

8. The electrical conductor of claim 1, wherein the conductor is made with copper, copper alloy, and wherein the conductor is well suited as messenger wire and contact wire for high speed rail, enabling a higher speed of a train;
wherein the strength member(s) have very low thermal expansion of less than $8 \times 10^{-6}/C$, and preferably less than $3 \times 10^{-6}/C$, and a knee point reduced to below the lowest field operating temperature, from factory pre-tensioning and/or stringing pre-tensioning, resulting in a virtually constant length messenger wire and contact wire regardless of weather condition, eliminating the need for a constant tensioning mechanism and associated maintenance to ensure leveling of the contact wire at all times, reducing maintenance cost;
wherein the contact wire with composite has a strength to weight ratio of greater than 70 MPa/(g/cc).

9. The electrical conductor of claim 1, wherein the conductor is made with copper, copper alloy or aluminum and aluminum alloys with or without a copper surface layer;
wherein the conductor is well suited as messenger wire and contact wire for high speed rail, where its strength member(s) have very low thermal expansion of less than $6 \times 10^{-6}/C$, and preferably less than $2 \times 10^{-6}/C$, and a knee point reduced to below the lowest field operating temperature, from factory pre-tensioning and/or stringing pre-tensioning, resulting in a virtually constant length messenger wire and contact wire regardless of weather condition, eliminating the need for a constant tensioning mechanism and associated maintenance to ensure leveling of the contact wire at all times;
wherein the contact wire with composite has a strength to density ratio of greater than 75 MPa/(g/cc).

10. The electrical conductor of claim 1, wherein the conductor is made with copper, copper alloy or aluminum and aluminum alloys with or without copper surface layer, and is well suited as messenger wire and contact wire for high speed rail, wherein its strength member(s) have very low thermal expansion of less than $2 \times 10^{-6}/C$, and preferably less than $1 \times 10^{-6}/C$, and a knee point reduced to below the lowest field operating temperature, from factory pre-tensioning and/or stringing pre-tensioning, resulting in a virtually constant length messenger wire and contact wire regardless of weather condition, eliminating the need for a constant tensioning mechanism and associated maintenance to ensure leveling of contact wire at all times;
wherein the contact wire with composite has a strength to density ratio of greater than 150 MPa/(g/cc).

11. A method of repairing the conductor of claim 8, wherein if the conductor is accidentally broken, repair is executed quickly in the field with conventional tools as there is little to no core or strength member slippage, and broken conductors also substantially preserve the feature of reduced thermal knee point from factory or stringing pre-tensioning;
wherein damage to the conductor is visually inspected as damage is observed in the conductive layer surface, unlike conventional stranded conductors with composite strength members.

12. The electrical conductor of claim 1, further comprising single or multiple optical fibers inserted into individual strength members or at the interface between the strength members and an encapsulating metal layer or within conductive layers.

13. The electrical conductor of claim 1, comprising a vibration damping device comprising protruded surface features that effectively disrupt vortex shedding in Aeolian vibration.

14. The electrical conductor of claim 1, wherein the encapsulated strength member is well protected from damage due to mishandling during installation;
wherein the strength member is well suited for regions where conductor stringing condition is not ideal (tough terrain, inexperienced labor and inadequate equipment);
wherein the conductor has a thermal knee point sufficiently reduced to below its stringing temperature, making the installation process simple and cost effective, where consistency in conductor sagging can be easily obtained regardless of minor changes and variation in stringing practice, and thus is preferable for phase conductors, especially in bundled configurations.

15. The electrical conductor of claim 1, wherein the encapsulating layer has spiral grooves; wherein the strength member in the resulting encapsulated conductor is configured such that it preserves maximum spring back from the spool while minimizing additional compression to the encapsulating layer from being.

16. The electrical conductor of claim 1, comprising conductor ends that are sealed, such as with silicon based sealants, wherein the insulation layer between carbon fibers and the conductive encapsulating layer may be unnecessary as, having sealed ends, there would be no moisture ingress through the encapsulating layer into the carbon fiber composite strength member;
wherein such conductor configuration can be applied to messenger wire and contact wire in all electrified train or railed cars;
wherein the conductor without insulating layer may also be considered for bare transmission and distribution conductors in an electric grid, as well as insulated (i.e., covered) distribution conductors.

17. The electrical conductor of claim 1, wherein the conductor is covered with insulation capable of high temperature operation, for use as a high temperature cable;
wherein the insulation layer may include, polyethylene, high density polyethylene, cross linked polyethylene, PVC, Teflon, and silicone based materials;
wherein the insulating layer may comprise organic or inorganic filler materials, including continuous or discontinuous fibers (chopped), such as glass or basalt fibers or any other insulating fibrous materials.

* * * * *